US008755983B2

(12) United States Patent
Ota et al.

(10) Patent No.: US 8,755,983 B2
(45) Date of Patent: Jun. 17, 2014

(54) VEHICULAR CONTROL APPARATUS AND METHOD

(75) Inventors: Ryo Ota, Tokyo (JP); Toshiya Oosawa, Yokohama (JP); Jun Kubo, Hino (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 504 days.

(21) Appl. No.: 12/879,195

(22) Filed: Sep. 10, 2010

(65) Prior Publication Data

US 2011/0066343 A1    Mar. 17, 2011

(30) Foreign Application Priority Data

Sep. 17, 2009  (JP) ................. 2009-215802

(51) Int. Cl.
*G06F 7/70* (2006.01)
*G06F 7/00* (2006.01)

(52) U.S. Cl.
USPC ............................. 701/70; 701/34; 701/446

(58) Field of Classification Search
None
See application file for complete search history.

(56) References Cited

U.S. PATENT DOCUMENTS

| | | | | |
|---|---|---|---|---|
| 5,307,419 A * | 4/1994 | Tsujino et al. | ................ | 382/153 |
| 5,410,346 A * | 4/1995 | Saneyoshi et al. | ............ | 348/116 |
| 5,479,173 A * | 12/1995 | Yoshioka et al. | ............... | 342/70 |
| 5,555,555 A * | 9/1996 | Sato et al. | ..................... | 382/104 |
| 5,638,116 A * | 6/1997 | Shimoura et al. | ............. | 348/118 |
| 5,739,848 A * | 4/1998 | Shimoura et al. | ............. | 348/119 |
| 5,892,855 A * | 4/1999 | Kakinami et al. | ............ | 382/291 |
| 6,285,393 B1 * | 9/2001 | Shimoura et al. | ............. | 348/119 |
| 6,535,114 B1 * | 3/2003 | Suzuki et al. | ................. | 340/435 |
| 6,556,133 B2 * | 4/2003 | Ogura | ............................ | 340/435 |
| 6,813,370 B1 * | 11/2004 | Arai | .............................. | 382/104 |
| 6,834,254 B2 * | 12/2004 | Sekiguchi | ..................... | 702/158 |
| 6,859,705 B2 * | 2/2005 | Rao et al. | ........................ | 701/45 |
| 6,859,730 B2 * | 2/2005 | Sekiguchi | ..................... | 701/301 |
| 6,950,789 B2 * | 9/2005 | Laird et al. | ....................... | 703/8 |
| 6,985,619 B1 * | 1/2006 | Seta et al. | ..................... | 382/154 |
| 6,987,534 B1 * | 1/2006 | Seta | .......................... | 348/229.1 |
| 6,993,159 B1 * | 1/2006 | Ishii et al. | ..................... | 382/104 |
| 7,130,448 B2 * | 10/2006 | Nagaoka et al. | ............. | 382/104 |
| 7,158,664 B2 * | 1/2007 | Nagaoka et al. | ............. | 382/154 |
| 2002/0149476 A1 * | 10/2002 | Ogura | .......................... | 340/436 |
| 2003/0060980 A1 * | 3/2003 | Prakah-Asante et al. | ...... | 701/301 |
| 2003/0078730 A1 * | 4/2003 | Sekiguchi | ..................... | 701/301 |
| 2003/0091228 A1 * | 5/2003 | Nagaoka et al. | ............. | 382/154 |
| 2003/0097237 A1 * | 5/2003 | Sekiguchi | ..................... | 702/158 |
| 2003/0138133 A1 * | 7/2003 | Nagaoka et al. | ............. | 382/104 |
| 2003/0154010 A1 * | 8/2003 | Rao et al. | ........................ | 701/45 |
| 2003/0210807 A1 * | 11/2003 | Sato et al. | ..................... | 382/104 |
| 2004/0183906 A1 * | 9/2004 | Nagaoka et al. | ............. | 348/148 |
| 2005/0002558 A1 * | 1/2005 | Franke et al. | ................. | 382/154 |
| 2005/0063565 A1 * | 3/2005 | Nagaoka et al. | ............. | 382/104 |
| 2005/0125121 A1 * | 6/2005 | Isaji et al. | ....................... | 701/36 |

(Continued)

FOREIGN PATENT DOCUMENTS

JP     2005-63398     3/2005

*Primary Examiner* — Ian Jen

(74) *Attorney, Agent, or Firm* — Antonelli, Terry, Stout & Kraus, LLP.

(57) ABSTRACT

In vehicular control apparatus and method, a traveling environment of a forward position of an advance direction of a vehicle in which an actuator for a vehicular control purpose is mounted is detected, a reliability of a result of measurement of the traveling environment by the traveling environment measurement section is determined, and an operation of the actuator is determined with the determined reliability as a requiring condition.

16 Claims, 17 Drawing Sheets

(56) References Cited

U.S. PATENT DOCUMENTS

| | | | |
|---|---|---|---|
| 2005/0125154 A1* | 6/2005 | Kawasaki | 701/301 |
| 2005/0143895 A1* | 6/2005 | Kato | 701/96 |
| 2005/0276447 A1* | 12/2005 | Taniguchi et al. | 382/103 |
| 2005/0276450 A1* | 12/2005 | Taniguchi et al. | 382/104 |
| 2006/0115121 A1* | 6/2006 | Saka et al. | 382/104 |
| 2006/0157639 A1* | 7/2006 | Shaffer et al. | 250/208.1 |
| 2006/0233424 A1* | 10/2006 | Miyajima et al. | 382/104 |
| 2007/0021912 A1* | 1/2007 | Morita et al. | 701/211 |

* cited by examiner

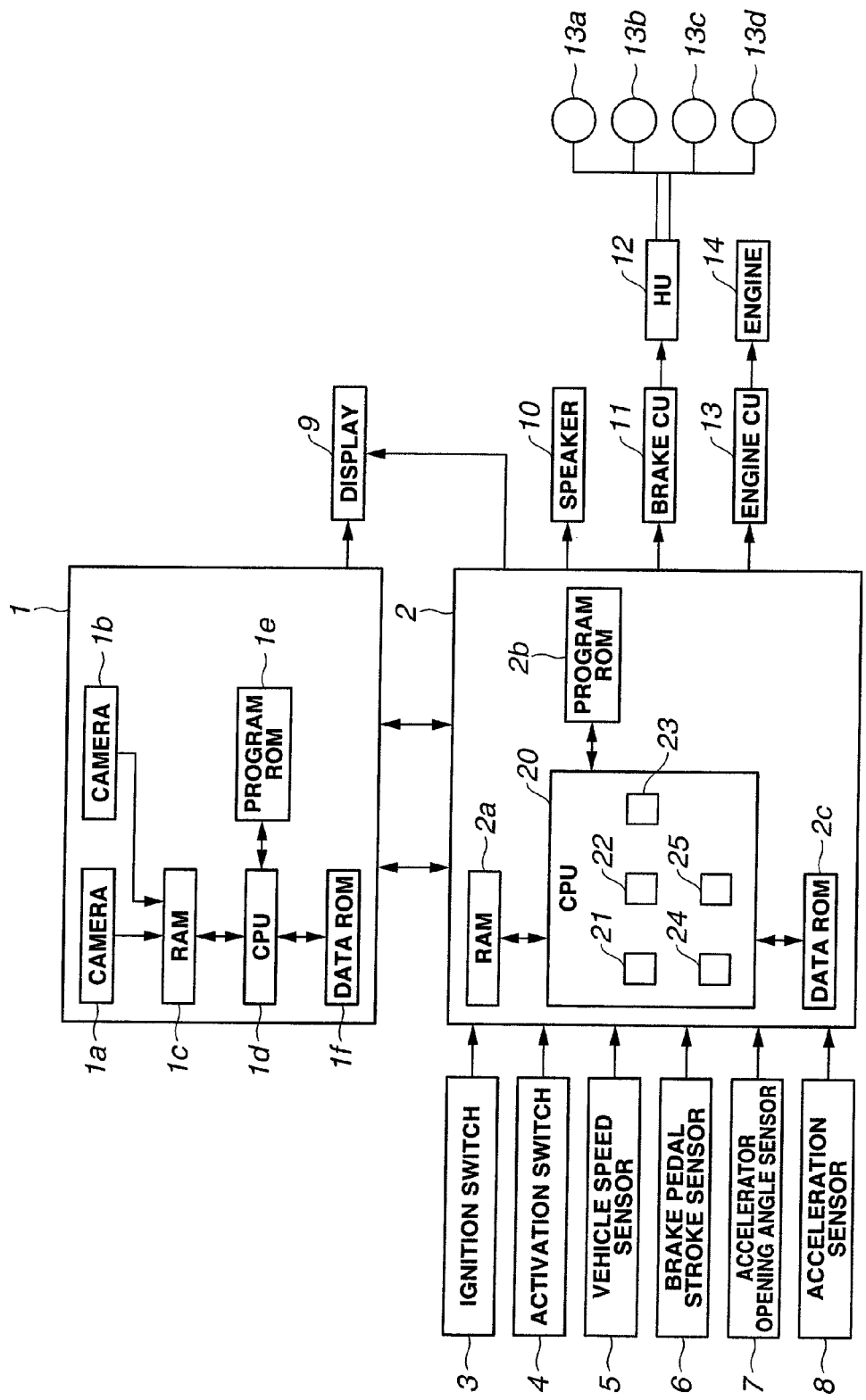

FIG.10

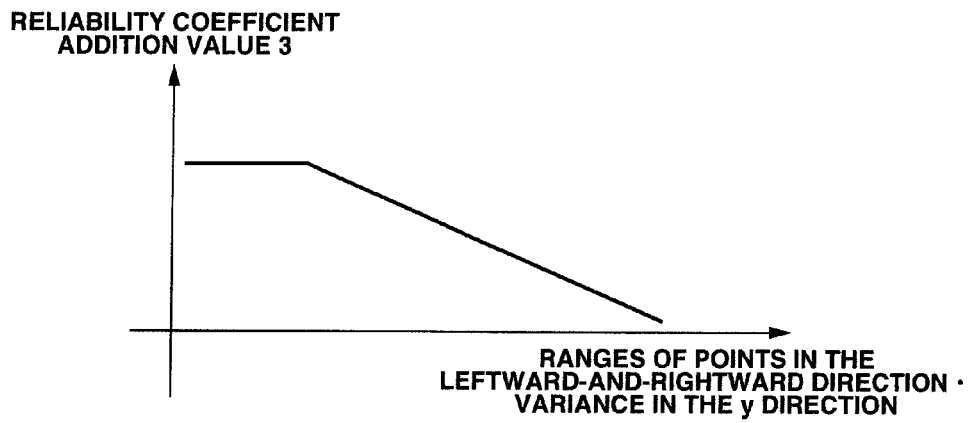

FIG.11

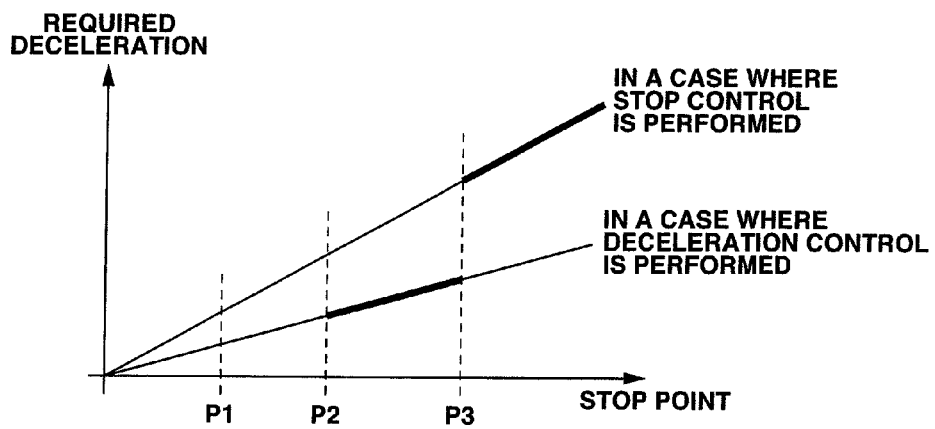

FIG.12

| STOP-LINE PRESENCE RELIABILITY | LARGE (EQUAL TO OR LARGER THAN A PREDETERMINED VALUE) | | | SMALL (EQUAL TO OR SMALLER THAN A PREDETERMINED VALUE) |
|---|---|---|---|---|
| STOP-LINE ARRIVAL TIME | ~T1 | T1~T2 | T2~ | |
| HOST VEHICLE SPEED: ~20km/h (CORRESPONDS TO A SLOW-SPEED DRIVING) | STOP CONTROL (DRIVER ALARM) | DECELERATION CONTROL (NOTIFICATION TO THE DRIVER) | NOTHING IS DONE (ENGINE BRAKING OR CONSTANT SPEED) | BASICALLY NOTHING IS DONE (DECELERATED ACCORDING TO DRIVERS OPERATION) |
| 20~30km/h | DECELERATION CONTROL | DECELERATION CONTROL | | |
| 30km/h~ | NOTHING IS DONE (ENGINE BRAKING OR CONSTANT SPEED) | | | |

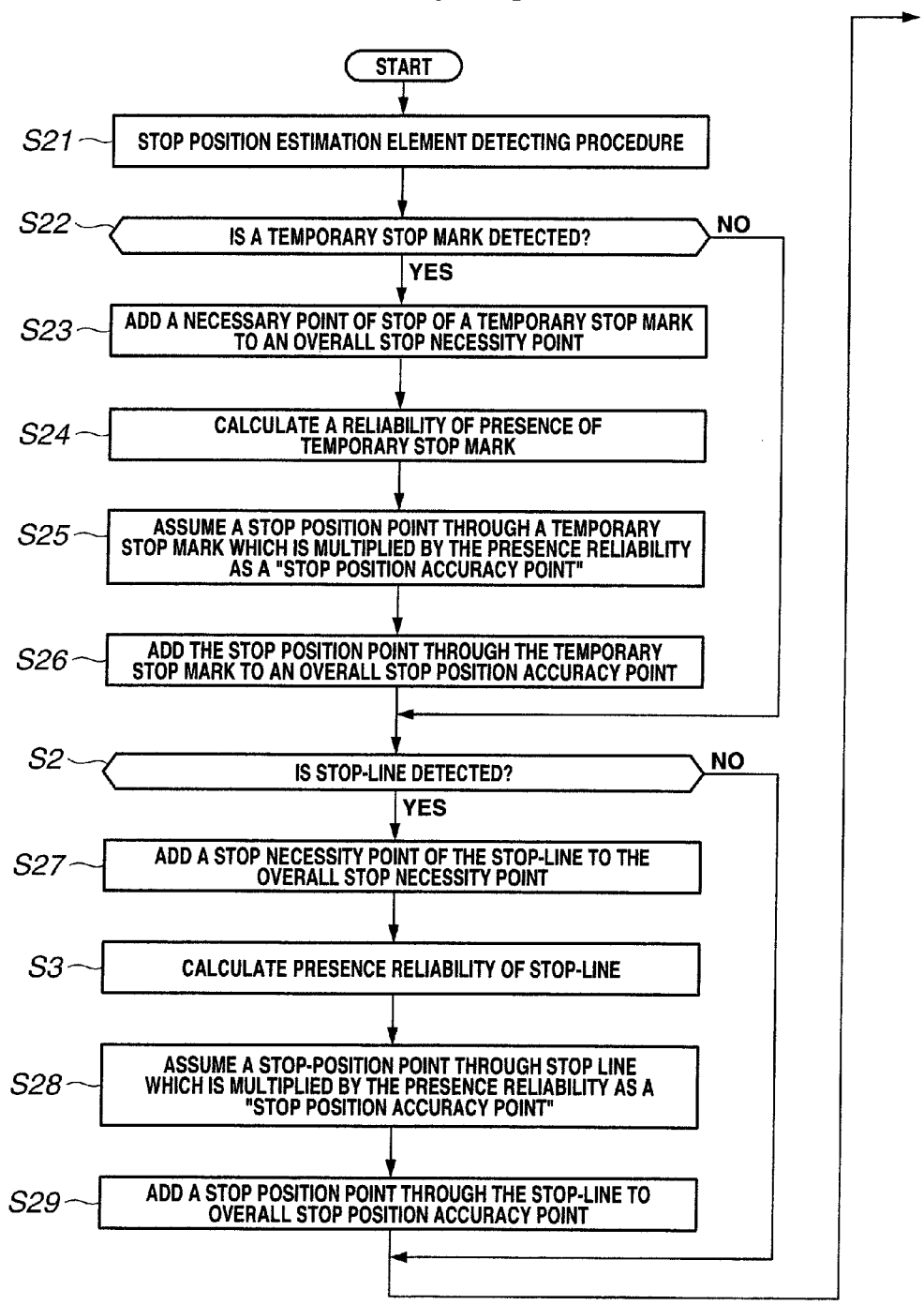

CROSS SECTION OF A-A'

CROSS SECTION OF D-D'

HEIGHT DIRECTION

CROSS SECTION OF C-C'

CROSS SECTION OF B-B'

FIG.18

| | STOP NECESSITY POINT ACCORDING TO THE OBJECT | STOP POSITION POINT ACCORDING TO THE OBJECT |
|---|---|---|
| STOP-LINE | △ (NEED WARNING) | ◎ (STOP POSITION ITSELF) |
| STOP MARK | ◎ (ESSENTIAL IN STOPPING) | ◎ (PRESENCE AT STOP POSITION) |
| PEDESTRIAN CROSSING PREDICTION REPRESENTATION | △ (NEED WARNING) | △ (POSITION OF OBJECT IS UNCLEAR: IF A FRONT POSITION BY A CONSTANT DISTANCE FROM ITS REPRESENTATION IS ESTIMATED AS A STOP POSITION, A PROPER STOP POSITION ACCURACY POINT IS LOWERED WHILE THE STOP POSITION ESTIMATED VALUE IS USED) |
| PEDESTRIAN CROSSING MARK | △ (NEED WARNING) | ◎ (PRESENT AT STOP POSITION) |
| TRAFFIC LANE PREDICTION MARK | △ (NEED WARNING) | △ (UNCLEAR AT AN OBJECT POSITION) |
| STOP-LINE MARK | ○ (HIGH POSSIBILITY REQUIRING STOP) | ◎ (PRESENT AT STOP POSITION) |
| RED TRAFFIC SIGNAL | ◎ (ESSENTIAL IN STOPPING) | ○ (WEAK IN A STOP POSITION DEFINITION IN A CASE WHERE RED SIGNAL IS PRESENT AT AN OPPOSITE SIDE OF A TRAFFIC LANE) |
| YELLOW TRAFFIC SIGNAL | ◎ (ESSENTIAL IN STOPPING, EXCEPTIONAL WHEN APPROACHING) | ○ (DITTO) |
| GREEN TRAFFIC SIGNAL | × (NOT NEEDED STOPPING) | ○ (DITTO) |
| PEDESTRIAN | △ (NEEDS WARNING: INCREASE A WARNING DEGREE IN A CASE WHERE THE VEHICLE IS PRESENT IN A PROXIMITY TO A PEDESTRIAN CROSSING OR STOP MARK) | △ (NEEDS WARNING BUT DIFFICULT TO MAKE A REFERENCE TO THE STOP POSITION DEFINITION) |

FIG.19

| | DETECTION RELIABILITY DETERMINATION ELEMENT |
|---|---|
| STOP-LINE | HEIGHT (PRESENT ON A ROAD SURFACE?), DEPTH, WIDTH (EQUAL TO AN OBLIQUE LINE WIDTH) |
| STOP MARK | HEIGHT, LATERAL POSITION, COLOR ("ERRONEOUS RECOGNITION AS THE SLOW GOING") |
| PEDESTRIAN CROSSING PREDICTION REPRESENTATION | PEDESTRIAN CROSSING MARK HEIGHT, LATERAL POSITION |
| PEDESTRIAN CROSSING MARK | HEIGHT, LATERAL POSITION |
| TRAFFIC LANE PREDICTION MARK | HEIGHT, LATERAL POSITION, CONTENT OF DESCRIPTION (ERRONEOUS RECOGNITION FOR OTHER WARNING MARKS) |
| STOP-LINE MARK | HEIGHT, LATERAL POSITION |
| RED TRAFFIC SIGNAL | HEIGHT, LATERAL POSITION (ERRONEOUS RECOGNITION AS A TALE LAMP), PRESENCE OR ABSENCE OF AN ARROW MARK SIGNAL (NO NEEDED OF STOPPING IF THE ADVANCE TO THE ARROW-MARKED DIRECTION: DETERMINED BY THE WINKER OR A TRAFFIC INTERSECTION), PRESENCE OR ABSENCE OF AN "AUXILIARY SIGNAL LAMP MARK" (NOT NEEDED IN STOPPING WHEN IT IS IN THE STOPPED POSITION), ERRONEOUS RECOGNITION AS THE PRESENT INDICATION TO DIFFERENT TRAFFIC (A PLURALITY OF SIGNALS ARE DETECTED AND MUTUALLY DIFFERENT PRESENT INDICATION) |
| YELLOW TRAFFIC SIGNAL | HEIGHT, LATERAL POSITION, PRESENCE OR ABSENCE OF "AUXILIARY SIGNAL LAMP" MARK, PRESENCE OR ABSENCE OF ARROW-MARK SIGNAL (LIGHT ON OR TURN ON-AND-OFF NO NEED IN STOPPING IF THE LIGHT IS TURNED ON OR OFF) |
| GREEN TRAFFIC SIGNAL | HEIGHT, LATERAL POSITION |
| PEDESTRIAN | HEIGHT (WHETHER CONTACTED ON ROAD SURFACE), LATERAL POSITION |

# VEHICULAR CONTROL APPARATUS AND METHOD

BACKGROUND OF THE INVENTION (1) Field of the Invention

The present invention relates to vehicular control apparatus and method.

(2) Description of Related Art

A vehicular control apparatus has previously been proposed in which a determination of whether a stop-line is present within a photographed image of a camera and, in a case where the determination is made that the stop-line is present, a driving support such as an information to a vehicle driver through a vocal sound, a driving intervention through a deceleration control, or so forth is carried out, as described in a Japanese Patent Application First Publication No. (tokkai) 2005-63398 published on Mar. 10, 2005.

SUMMARY OF THE INVENTION

A strong demand that an unpleasant feeling (or sense of incongruity) that the vehicle driver gives should desirably be reduced is present in the previously proposed vehicular control apparatus. It is, hence, an object of the present invention to provide vehicular control apparatus and method which can achieve the driving support which has a reduced quantity of unpleasant feeling that the vehicle driver gives.

The above-described object can be achieved by providing a vehicular control apparatus comprising: a traveling environment measurement section configured to measure a traveling environment of a forward position of an advance direction of a vehicle in which an actuator for a vehicular control purpose is mounted;
a reliability determination section configured to determine a reliability of a result of measurement of the traveling environment by the traveling environment measurement section; and an actuator control section configured to perform an operation of the actuator with the determined reliability as a requiring condition.

The above-described object can also be achieved by providing: a vehicular control apparatus comprising:
a camera photographing a situation of a forward position of an advance direction of a vehicle in which a braking controller is mounted; a reliability determination section configured to determine a reliability of whether a point to be stopped by the vehicle at the next is present from an image photographed by means of the camera; and
a braking control section configured to control an operation of the braking controller in accordance with the determined reliability.

The above-described object can also be achieved by providing: a vehicular control method comprising: photographing a situation of a forward position of an advance direction of a vehicle in which a braking controller is mounted through a camera; determining a reliability of whether a point to be stopped by the vehicle at the next is present from an image photographed by means of the camera; and a braking control section configured to control an operation of the braking controller in accordance with the determined reliability; and controlling an operation of the braking controller in accordance with the determined reliability.

BRIEF DESCRIPTION OF THE DRAWINGS

FIG. 1 is a configuration diagram of a vehicular control apparatus in a first preferred embodiment according to the present invention.

FIG. 10 is a diagram for explaining a setting map of a reliability coefficient addition value 3.

FIG. 11 is a graph representing a relationship between a stop point and a required deceleration in a case where a stop control and a deceleration control are carried out.

FIG. 12 is a graph representing a list of a supporting method based on a predicted arrival time to the stop line and a host vehicle speed to the stop-line.

FIGS. 13A and 13B are integrally a flowchart of a driving support control process by means of a control unit 2 in a second preferred embodiment of the vehicular control apparatus according to the present invention.

FIG. 18 is a graph representing a list of a stop necessity point of each object.

FIG. 19 is a graph representing a list of a method of determination of the reliability of the presence of each object.

DETAILED DESCRIPTION OF THE PREFERRED EMBODIMENTS

Figure 2A:
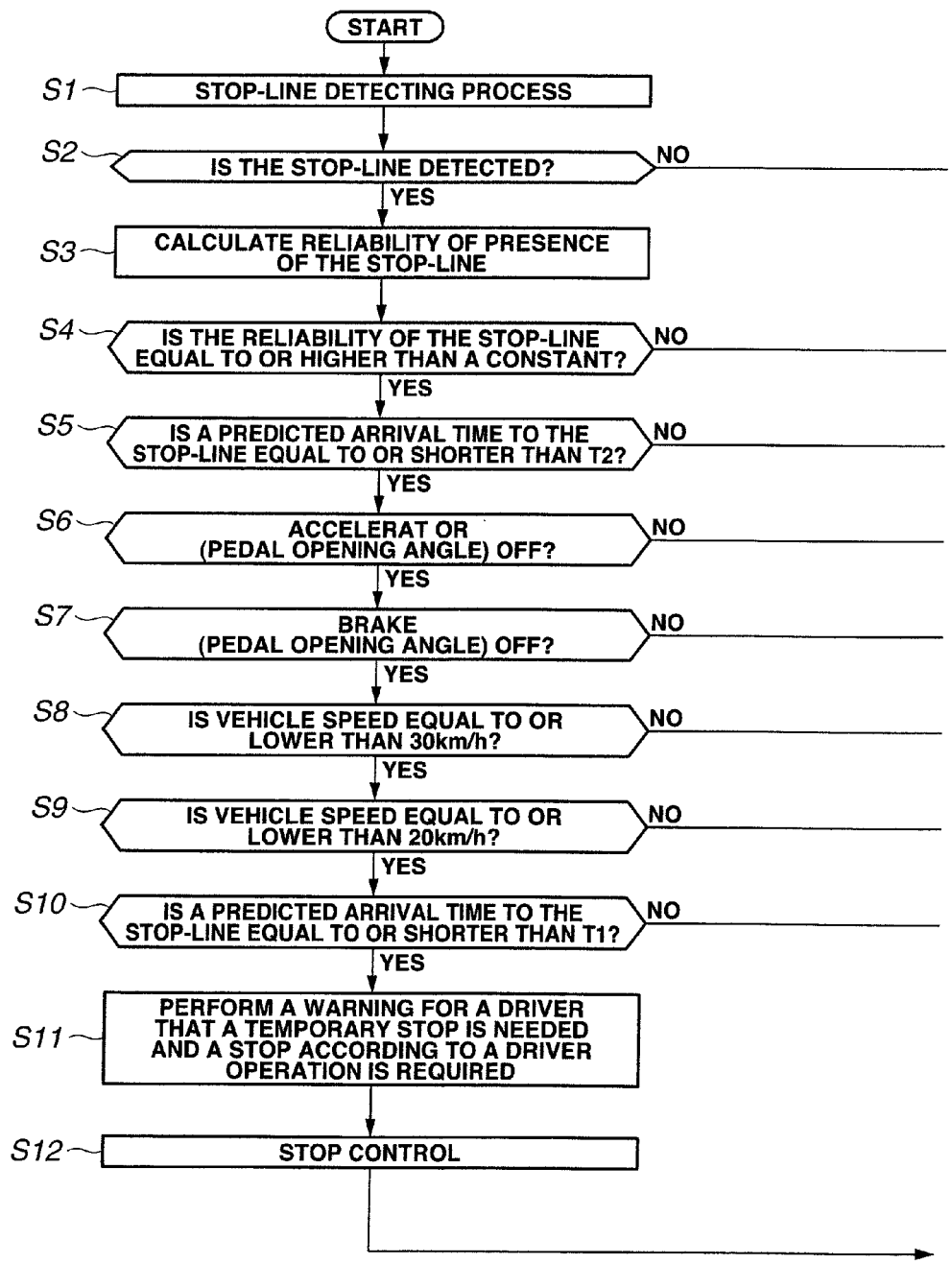
FIGS. 2A and 2B are integrally a flowchart representing a flow of a driving support control process by means of a control unit 2 in the first embodiment shown in FIG. 1.

Hereinafter, a detailed description of preferred embodiments of a vehicular control apparatus will be made with reference to the accompanied drawings in order to facilitate a better understanding of the present invention. The preferred embodiments to be described below have been discussed to be enabled to be applied to many needs and an enablement of reduction of an unpleasant feeling that a vehicle driver gives is one of the needs that have been discussed.

First Embodiment

First, a structure of the vehicular control apparatus in the first embodiment will be described with references to FIG. 1.

FIG. 1 shows a structure of the vehicular control apparatus in a first preferred embodiment according to the present invention. The vehicular control apparatus includes: a traveling environment recognition section 1; a control unit 2 (an actuator control section and a braking control section); an ignition switch 3; an activation switch 4; a vehicle speed sensor (speed detecting section) 5; a brake pedal stroke sensor 6; an accelerator opening angle sensor (accelerator pedal operation state detection section) 7; an acceleration sensor 8; a display 9; a speaker 10; a brake control unit 12 (hereinafter, brake CU); a liquid pressure unit (hereinafter, HU) 12; wheel cylinders 13a, 13b, 13c, and 13d; an engine control unit (hereinafter, engine CU) 14; and an engine (an actuator) 15.

Traveling environment recognition section 1 includes: a pair of on-board mounted cameras 1a, 1b (traveling environment measurement section and, hereinafter, called cameras); a RAM 1c; a CPU 1d; a program ROM 1e; and a date ROM 1f. Cameras 1a, 1b are mounted on left and right sides of, for example, an inside rear view mirror. Cameras 1a, 1b are a stereo camera photographing a front part in an advance (forwarding) direction of the vehicle itself at a predetermined looking-down angle at a predetermined mount position. The stereo camera can determine a distance to an object according to a principle of triangulation utilizing a difference in view developed when two cameras are used to photograph the object at the same measurement point. For example, suppose that a distance of the cameras to the object is Z, a distance between the cameras is B, a focal distance of the cameras is f, and the parallax is δ. Distance Z can be determined from the following equation (1). In equation (1), a unit is wholly the same (for example, mm).

$$Z=(B \times f)/\delta \qquad (1)$$

The photographed images by stereo camera 1a, 1b are captured into RAM 1c. Program ROM 1e serves to detect a traffic lane, marks, and solid bodies to be executed by CPU 1d and stores programs to calculate the distances. CPU 1d executes the above-described program with reference to templates such as traffic lanes, marks, solid bodies, and so forth, detects white lines, road marks, solid bodies, and so forth from the photographed images, and calculates the distance from these objects. It should herein be noted that traveling environment recognition section 1 detects a stop-line present on the road surface. As described above, since the distance to an object to be detected can be measured, the determination that only a part present in the road surface can be measured is the stop-line from among parts of the photographed image which may apparently be the stop-line so that an erroneous determination of the stop-line due to noises and another substance can be suppressed.

Control unit 2 includes: a RAM 2a; a CPU 20; a program ROM 2b; and a data ROM 2c. RAM 2a captures the information on a result of detection by means of traveling environment recognition section 1. Program ROM 2b records a program to perform a driving support such as an information notification and a deceleration control to be executed by CPU 20. CPU 20 refers to data recorded on the information from each switch and each sensor and from data ROM 2c and controls a display 9, a speaker 10, and brake CU 11. For example, in a case where a speed of the vehicle is in excess of a most appropriate speed which is varied in accordance with a road form and so forth, CPU 20 informs the driver using at least one of display 9 and speaker 10 that the present vehicle speed is in excess of the most appropriate speed. Or alternatively, CPU 20 outputs a request to develop the deceleration force to develop a deceleration against driver S7. An ignition switch 25 is turned on when engine 15 is started and turned off when engine 15 is stopped. Activation switch 4 is installed within a passenger compartment and is a switch to activate a information or a driving intervention program. When activation switch 4 is turned to ON, control unit 2 and traveling environment recognition measurement system 1 is activated. Vehicle speed sensor 5 detects a vehicle body speed of a host vehicle to which the vehicular control apparatus in the first embodiment is applicable (hereinafter also called, a subject vehicle or a vehicle itself). A brake pedal stroke sensor 6 serves to detect a stroke quantity of a brake pedal. An accelerator opening angle sensor 7 serves to detect an accelerator (pedal) opening angle quantity. Accelerator opening angle sensor 7 is configured to be proportional to a stroke quantity of the accelerator pedal operated by the vehicle driver. Hence, the detection of the accelerator opening angle can detect an operational state of the accelerator pedal. Acceleration sensor 8 detects a forward-and-backward direction acceleration (longitudinal acceleration) and leftward-and-rightward direction acceleration (lateral acceleration) acted upon the host vehicle. Display 9 is installed within the vehicle passenger compartment to display the information from traveling environment recognition section 1 and control unit 2. Speaker 10 issues an alarm to the driver in accordance with the command from control unit 2. Brake CU 11 controls liquid pressure unit 12 in accordance with the demand from control unit 2. HU 12 is provided with a pump and a plurality of valves and controls brake liquid pressures supplied to respective wheel cylinders 13a, 13b, 13c, and 13d in accordance with brake commands issued from brake CU 11. Each wheel cylinder 13a, 13b, 13c, and 13d is provided with each road wheel. In addition, a braking force is provided for each of the wheels in accordance with its corresponding liquid pressure. In the following specification, brake CU 11, HU 12, and each of wheel cylinders 13a, 13b, 13c, and 13d are totally called a braking controller (an actuator) providing the driving force for the vehicle. Engine control unit CU 13 performs a fuel cut-off (the fuel reduction) of engine 14 in accordance with the demand from control unit 2 and develops an engine brake.

[Driving Support Control Process]

Figure 2B:
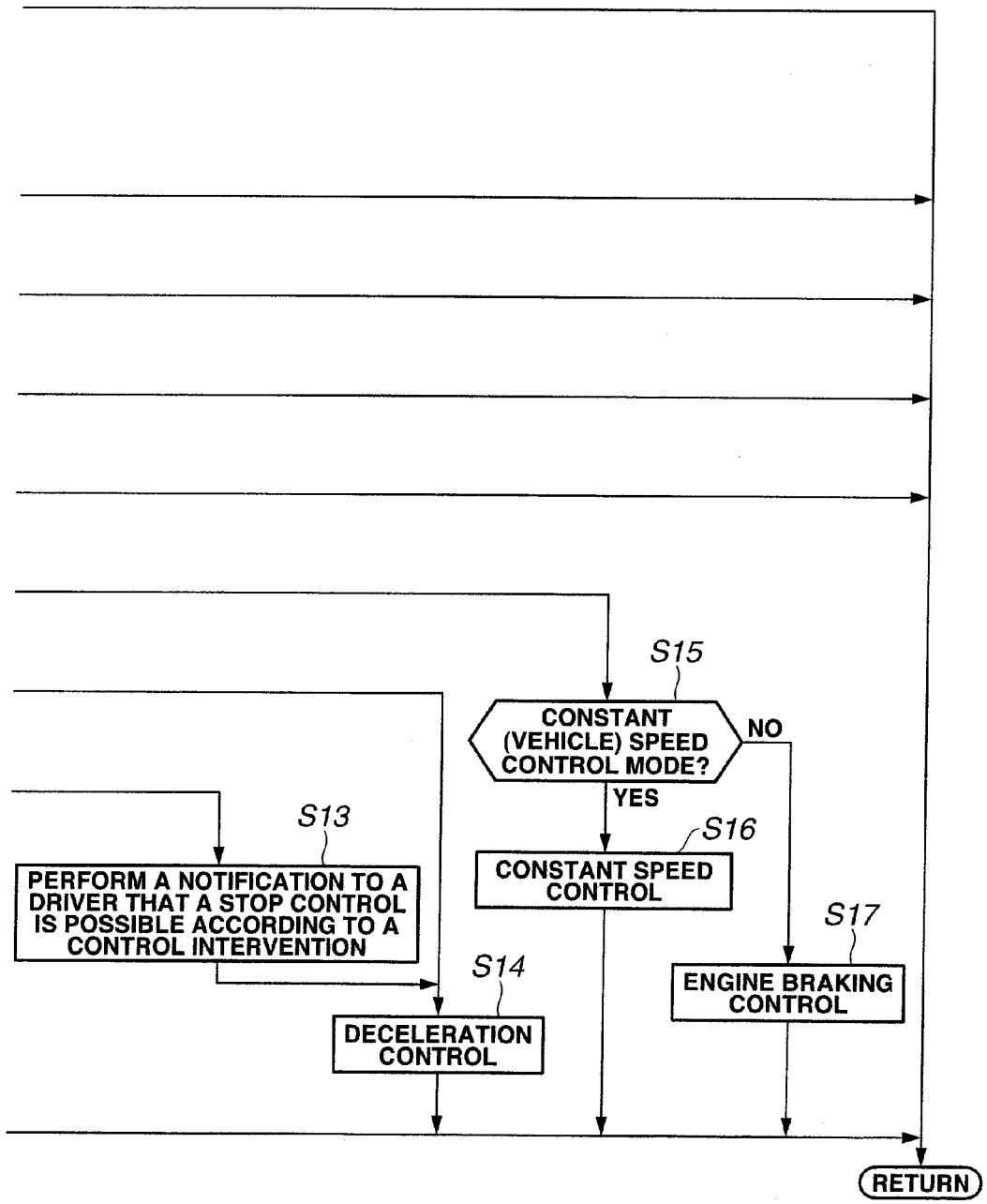

FIGS. 2A and 2B integrally show a flowchart representing a flow of a driving support control process by control unit 2 in the first embodiment. Each step will, hereinbelow, be described in details.

This process is repeatedly executed at a predetermined calculation period.

At a step S1, control unit 2 executes a stop-line detection process in which control unit 2 issues a command to detect a stop-line of a forward position of the advance direction of the vehicle from the photographed image to traveling environment recognition section 1 and the routine goes to a step S2. At step S2, control unit 2 identifies the stop-line by detecting a whitish region drawn on a road surface in a lateral direction with respect to the photographed image.

It should be noted that, in a case where pair of cameras 1a, 1b is structured to have no capability to of identifying a color, CPU 20 (control unit 2) identifies the stop-line by detecting a region having a higher brilliance than the surrounding.

Figure 3:
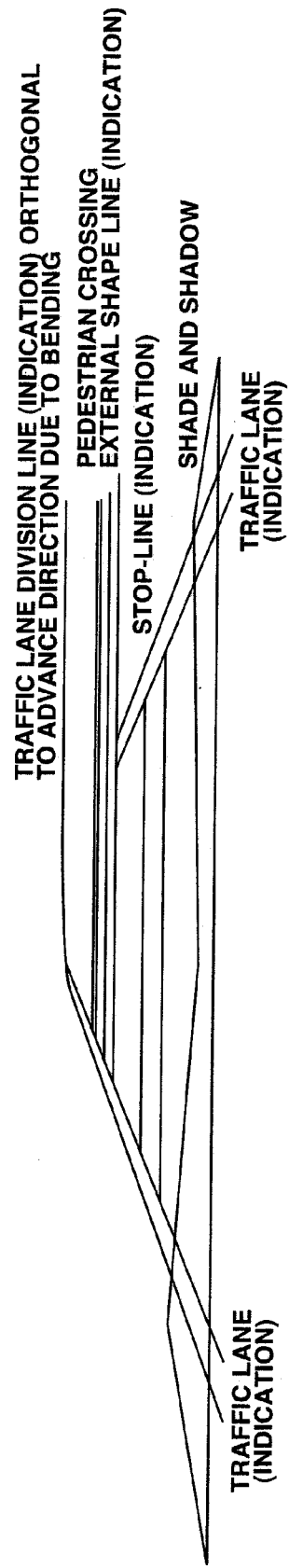
FIG. 3 is a diagram for explaining a difference in view between a stop-line and another line in a case where a traffic lane in the same advance direction is only the traffic lane on which a host vehicle itself is travelled.
Figure 4:
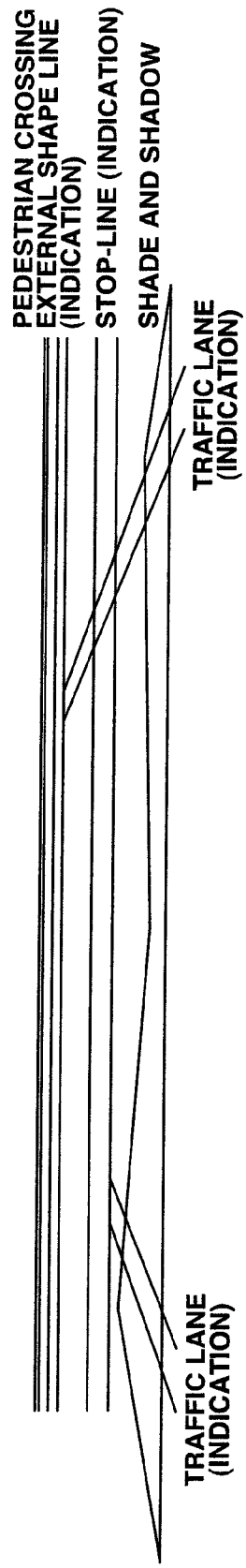
FIG. 4 is a diagram for explaining a difference in view between the stop-line and other lines in a case where a plurality of traffic lanes are present in the same advance direction.
Figure 5:
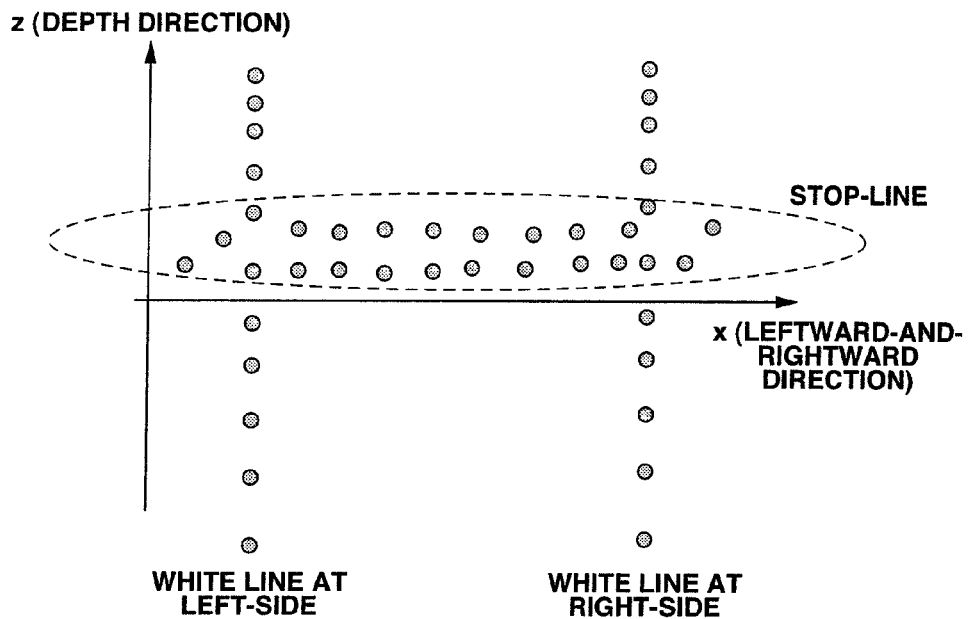
FIG. 5 is a diagram for explaining an example of a reliability calculation method to detect the stop-line.

It should also be noted that an addition of such determination criteria that a point of intersection between a stop-line candidate region and a traffic lane division line shown in FIG. 3 is set to a terminal, the point of intersection between a traffic lane division line and a stop-line candidate region shown in FIG. 4 is set to a terminal, and a brilliance between the traffic lane division line and the stop-line candidate region has the same level of brilliance therebetween serves to perform the identification from a region having a high lateral brilliance developed accidentally due to a shade-and-shadow developed on a road surface, a division line on a pedestrian crossing region, a traffic lane block line, the traffic lane division line as shown in FIG. 4, a block line of a bicycle crossing band, and a traffic lane of a crossing road, or other of the stop-line.

At step S2, CPU 20 (control unit 2, stop-line determination section 21) determines whether the stop-line has been detected. If Yes, the routine goes to a step S3. If No at step S2, the routine transfers to RETURN.

At step S3, a reliability determination section 22 (control unit 2) calculates' a reliability of presence of the stop-line and the routine goes to a step S4. In the first embodiment, three reliability coefficient addition values 1, 2, and 3 are added together so that a total sum value thereof is assumed to be the reliability of presence.

Figure 6:
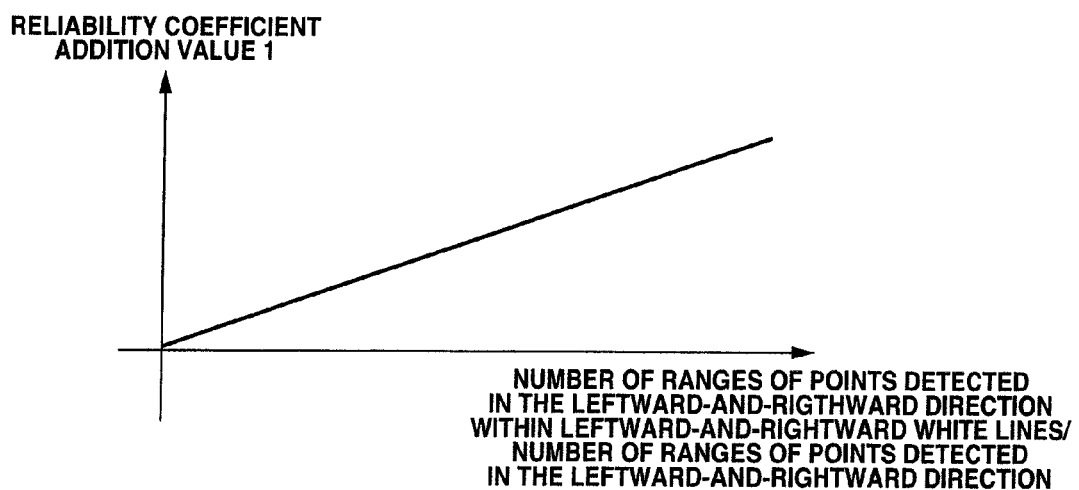
FIG. 6 is a diagram for explaining a map for setting a reliability coefficient addition value 1.
Figure 7:
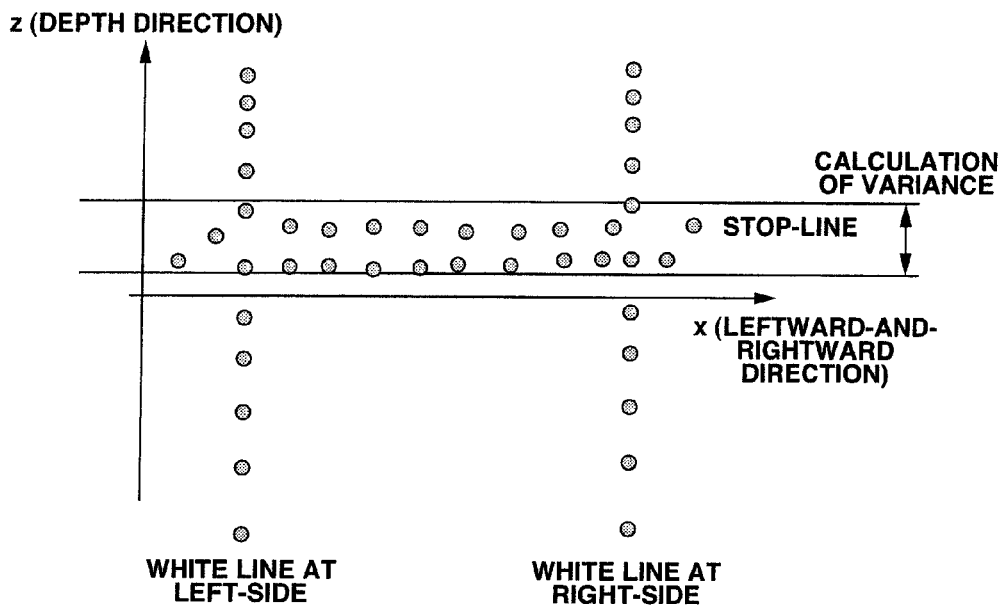
FIG. 7 is a diagram for explaining an example of a calculation method of the reliability of the stop-line detection.

For example, in a width-oriented region in a certain depth direction, as the number of points present in a region surrounded by a leftward-or-rightward traffic lane division line becomes increased from among the points detected in the leftward-or-rightward direction and having high brilliances or as a rate of points present in a region surrounded by leftward-or-rightward traffic lane division line becomes increased, the reliability as the stop-line is deemed to be high and reliability coefficient addition value 1 is made high (refer to FIG. 6).

In addition, for the width in the depth direction, a variance of the points in the depth direction of the photographed image, each point having the high brilliance, is calculated.

Figure 8:
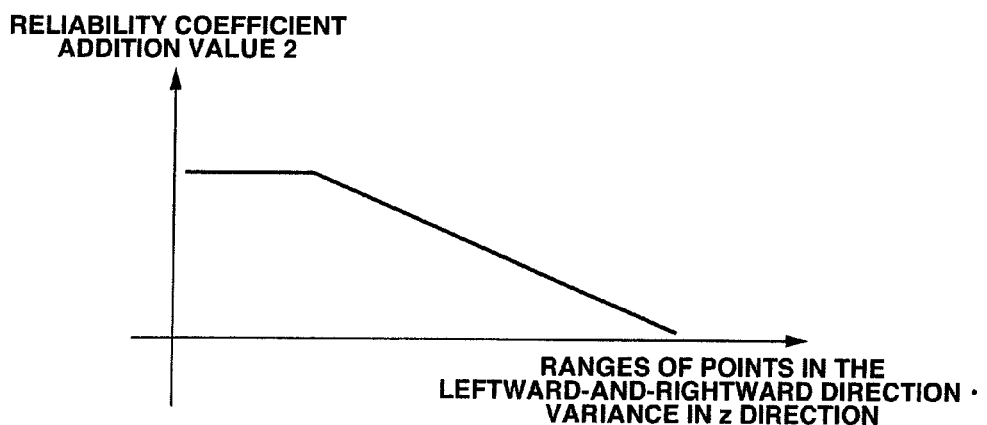
FIG. 8 is a diagram for explaining a map for setting a reliability coefficient addition value 2.

If the value of the variance is large, there is a high possibility of no presence of the stop-line and reliability coefficient addition value 2 is made low (refer to FIG. 8). It should be noted that, in a case of FIG. 8 where the value of the variance is less than a constant, reliability coefficient addition value 2 provides a constant maximum value. On the other hand, in a case where the value of the variance is excessively small, there is a possibility of a fine line not the stop-line. Hence, in this case, reliability coefficient addition value 2 may be made small.

Figure 9:
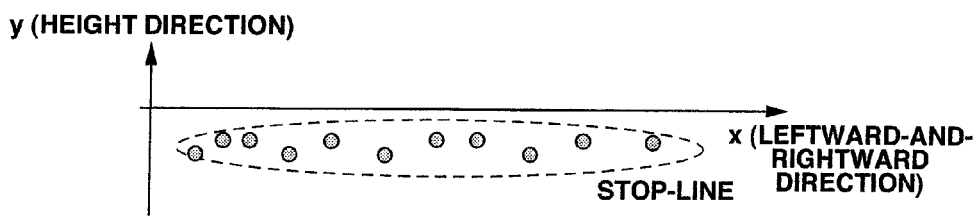
FIG. 9 is a diagram representing another Example of a reliability calculation method for the stop line detection.

Furthermore, in a case where the variance in the height direction of the points having high brilliances as shown in FIG. 9 is calculated and the variance value is large, there is a possibility of no presence of the stop-line and reliability coefficient addition value 3 is made low (refer to FIG. 10). It should be noted that the average in the height direction of the points whose brilliances are high is calculated and in a case where the average value is separated from a road surface height, reliability coefficient addition value 3 may be lowered.

Referring back to FIGS. 2A and 2B, a determination is made by control unit 2 of whether the reliability of presence in the stop-line is equal to or higher than a constant (a predetermined value). If Yes at step S4, the routine goes to a step S5. If No at step S4, the routine transfers to RETURN.

At step S5, a determination is made of whether a predicted arrival time to the stop-line calculated by means of an arrival time (duration) calculation section 23 is equal to or shorter than a predetermined time T2. If Yes at step S5, the routine goes to a step S6. If No at step S5, the routine transfers to RETURN. At step S6, the determination by control unit 2 is made of whether an accelerator is OFF according to the determination of whether the accelerator opening angle is equal to or smaller (narrower) than a predetermined opening angle A1. If Yes, the routine goes to a step S7.

If No, the routine transfers to RETURN.

It should, herein, be noted that above-described predetermined opening angle A1 is a maximum value of the accelerator opening angle by which the driving force is not developed.

At step S7, the determination is made of whether the brake is OFF.

If Yes, the routine goes to a step S8.

If No, the routine transfers to RETURN.

At step S8, the determination by control unit 2 of whether the host vehicle speed is equal to or slower than 30 Km/h is made. If Yes, the routine goes to a step S9. If No, the routine transfers to RETURN.

At step S9, the determination of whether the host vehicle speed is equal to or slower than 20 Km/h is made. If Yes, the routine goes to a step S10. If No, the routine goes to a step S14.

At step S10, the determination is made of whether the predicted arrival time to the stop-line calculated by means of arrival time calculation section 23 is equal to or shorter than another predetermined time T1 (<T2). If Yes, the routine goes to a step S11. If No, the routine returns goes to a step S13.

At step S11, an alarming is issued such that the driver needs to make a temporary stop and the stop due to the operation by the driver is requested using speaker 10 and display 9 and the routine goes to a step S12.

At step S12, a vehicular stop control to output the request for the host vehicle speed to zero at an intermediate time before the stop line for brake CU 11 is made and the control transfers to RETURN.

At step S13, a notification to an effect that a vehicular stop control is needed through a control intervention for the driver using display 9 and speaker 10 is needed and the routine goes to a step S14.

At step S14, a deceleration control to output a request such that a smaller deceleration than the stop control is developed. Then, at step S15, the determination of whether the constant control mode is carried out and the routine transfers to RETURN.

The constant speed control mode and the engine brake mode are modes for the driver to select either mode according to a switching by the vehicle driver.

At step S16, the request to carry out a constant speed control to maintain the constant speed is issued and the routine transfers to RETURN. If Yes, the routine goes to a step S16. If No, the routine goes to a step S17.

At step S17, the request to perform a request of developing the engine brake for engine CU 13 and the routine transfers to RETURN.

FIG. 11 shows a graph representing a relationship between the stop point and the required deceleration in a case where the vehicular stop control and the deceleration control are executed. The stop points represents that points become nearer to the host vehicle in the sequence of P3, P2, and P1. As shown in FIG. 11, the vehicular stop control is carried out at stop points equal to or larger than P3 at which the predicted arrival time to the stop-line is equal to or shorter than T1. The deceleration control is carried out at any points between P2 and P3 at which the predicted arrival time is between T1 and T2. Neither the vehicular stop control nor the deceleration control is carried out at points between P1 and P2 at which the predicted arrival time is in excess of T2. FIG. 12 shows a list of the supporting method based on the height of the reliability of the presence of the stop-line calculated in the driving support control procedure and supporting method based on the predicted arrival time to the stop-line and the host vehicle speed.

Next, an action of the first embodiment will be described below.

[Reduction Action of Unpleasant Feeling (Sense of Incongruity) at a Time of Driving Support]

The previously proposed vehicular control apparatus described in the Japanese Patent Application First Publication No. 2005-063398 determines the execution of the driving support depending upon whether the stop-line is detected. Hence, a height of the reliability on the result of detection does not reflect on the driving support. Hence, when the driving support based on the result of detection is based on an erroneous detection, an optimum driving support in accordance with the actual situation, namely, the driving support that the driver desires cannot be carried out so that there is a possibility that an unpleasant feeling (sense of incongruity) is given to the vehicle driver. Especially, since a distance from the photographed image of a single camera to the stop-line is calculated in a case of the previously proposed Japanese Patent Application First Publication, the reliability of the result of detection is low and there is a possibility of the driving support based on the accurate result of detection. It should be noted that the distance to the stop-line calculated from the photographed image using the information on the car navigation system is corrected. However, in a case where the information stored in the data base of a car navigation system is different from the actual situation, an improvement in reliability cannot be desired.

On the other hand, control unit 2 in the first embodiment calculates the reliability of presence of the stop-line detected by traveling environment recognition section 1 (step S3), performs any one of the following driving supports of the vehicular stop control (step S12), the deceleration control (step S14 or step S17), and the constant vehicle speed control (step S16) in a case where the reliability of presence is equal to or higher than the predetermined value, and, when the reliability of presence is smaller than the predetermined value, the driving support is not performed.

In other words, the height of the reliability for the result of detection (reliability of the presence) is reflected on the driving support and the degree of control intervention is varied in accordance with the height of the reliability of presence. Hence, a separation of the actual driving support from an optimum driving support in accordance with the actual situation can be suppressed so that the unpleasant feeling that the vehicle driver gives can be reduced. It should be noted that traveling environment recognition section 1 detects the stop-line from the photographed image of stereo camera 1*a*, 1*b* by which the distance to the detected object can be measured. The predicted arrival time can be calculated with high accuracy and the driving support which accords with the distance to the stop-line can be carried out.

In addition, control unit 2 carries out the driving support only if the accelerator OFF at step S6 and the brake OFF at step S7 are resulted and does not carry out the driving support when the accelerator ON at step S6 and the brake ON at step S7 are resulted.

If the control intervention for the driving support such as the deceleration control against the acceleration by the driver is performed against the driver's acceleration intention, there is a possibility that the unpleasant feeling is given to the vehicle driver. Thus, if the deceleration or acceleration intention is present in the driver, the driving support is limited while the driver operation is free so that the unpleasant feeling that the driver gives can be prevented from occurring.

Reliability determination section 22 in control unit 2 determines that the reliability of presence is higher as the number of points, each point having the high brilliance, detected in the leftward-and-rightward direction are increased or the rate of points present within the region grasped by the leftward-and-rightward traffic lane division lines from among these points become increased, as shown in FIG. 6. In addition, as shown in FIG. 8, the determination is made that the reliability of presence is high in a case where the variance in the depth direction is small and that the reliability of presence is low in a case where the variance is large. Furthermore, as shown in FIG. 10, the reliability of presence is high in a case where the variance of the points having high brilliances is small and is low in a case where the variance thereof is large. The stop-line is a white line and its brilliance within the photographed image is high as compared with the road surface. Hence, the reliability of presence is determined according to the brilliance so that even if the cameras 1*a*, 1*b* cannot determine the color, the region of the stop-line can easily be grasped within the photographed image. In addition, the density of the points having the high brilliances becomes higher, the reliability of presence can be high so that a determination accuracy of the reliability can be enhanced.

In a case where control unit 2 determines that the host vehicle speed is equal to or slower than 30 Km/h at step S8 or determines that the host vehicle speed is equal to or slower than 20 Km/h at step S9, control unit 2 carries out the vehicular stop control. However, control unit 2 carries out the deceleration control if the host vehicle speed is higher than 20 Km/h. For example, in a situation under which a traffic intersection or a pedestrian is detected by means of traveling environment recognition section 1 but the determination that the driver himself judges that the stop is not needed, the unpleasant feeling is given to the vehicle driver in a case where the deceleration control is performed. On the other hand, in a case where the host vehicle speed is equal to or slower than 30 Km/h with both of the accelerator and the brake in OFF state, the determination that there is a possibility of having the stop intention can be made. Thus, only in the present case, the vehicular stop control or the deceleration control is carried out. In a case where the determination can be made that the driver does not have the stop intention, the vehicular stop control or the deceleration control is limited so that the unpleasant feeling that the driver gives can be reduced. It should be noted that, in a case where the host vehicle speed is equal to or higher than 30 Km/h, the host vehicle speed is maintained at a constant speed when the constant speed control mode is selected and the engine braking is developed when the engine braking mode is selected. Thus, the traveling state that the driver desires can be maintained.

Control unit 2 carries out the vehicular stop control in a case where a predicted arrival time to the stop line is equal to or shorter than predetermined time T1 and carries out the deceleration control in a case where the predicted arrival time is longer than predetermined time T1. Thus, the vehicle can be decelerated in accordance with the position of the stop-line. In addition, in a case where the determination is made that the predicted arrival time to the stop-line is longer than predetermined time T2 at step S5, the deceleration control is not carried out. Hence, since a weak deceleration control from a remote position of the stop-line is continued, the prevention of the unpleasant feeling that the driver gives can be achieved. In addition, since the deceleration control from the remote position is not carried out, the erroneous detection of the situation under which the vehicle is to be stopped can be prevented.

Next, advantages of the first embodiment of the vehicular control apparatus will be explained below.

(1) The vehicular control apparatus mounted in a vehicle in which an actuator (engine 15, the braking controller) for a vehicular control purpose is equipped includes: traveling environment measurement section 1 (cameras 1a, 1b) configured to measure the traveling environment located at the front position in the vehicular advance direction; reliability determination section 22 configured to determine the reliability on the result of detection (the reliability of presence) of the traveling environment by means of the traveling environment measurement section; and control unit 2 configured to perform the operation of the actuator with the determined reliability as a requiring condition.

Thus, the operation of the actuator can be approached to an optimum operation in accordance with the actual traveling environment and the driving support which gives less unpleasant feeling to the driver can be achieved.

(2) The traveling environment measurement section is cameras 1a, 1b and reliability determination section 22 is configured to calculate brilliances of the plurality of points within the image of the road surface as the traveling environment photographed through cameras 1a, 1b and to determine the reliability of the stop-line drawn on the road on a basis of the calculated brilliances. Thus, even if cameras 1a, 1b cannot determine the color, the region of the stop-line can easily and accurately be grasped from the internal of the image.

(3) Since the actuator is the damping control apparatus, the deceleration of the vehicle can be made in accordance with the reliability of the stop-line and the driving load that the driver has can be reduced.

(4) Accelerator opening angle sensor 7 is provided to detect the operating state of the accelerator pedal that the driver operates. Control unit 2 operates the braking controller in accordance with the calculated reliability to decelerate the vehicle in a case where the deceleration is intention of the driver (accelerator OFF) is detected from the detected operation state of the accelerator pedal. Thus, the unpleasant feeling that the driver gives when the vehicle is decelerated against the acceleration intention by the vehicle driver can be prevented.

Second Embodiment

First, the structure of the vehicular control apparatus in a second preferred embodiment according to the present invention will be described below. The same structure as the first embodiment will, herein, be omitted.

[Driving Support Control Process]

Figure 13B:
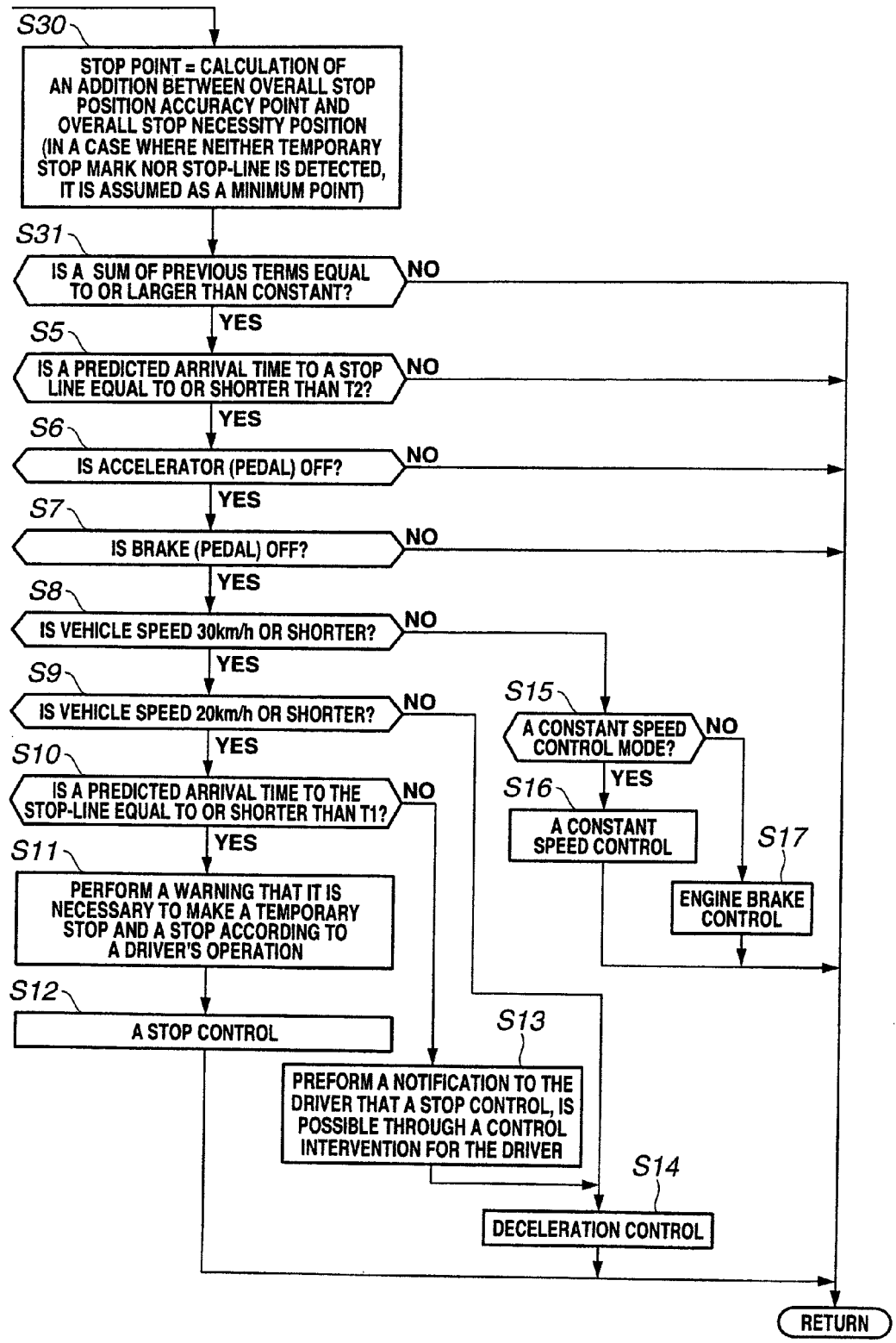
Figure 14:
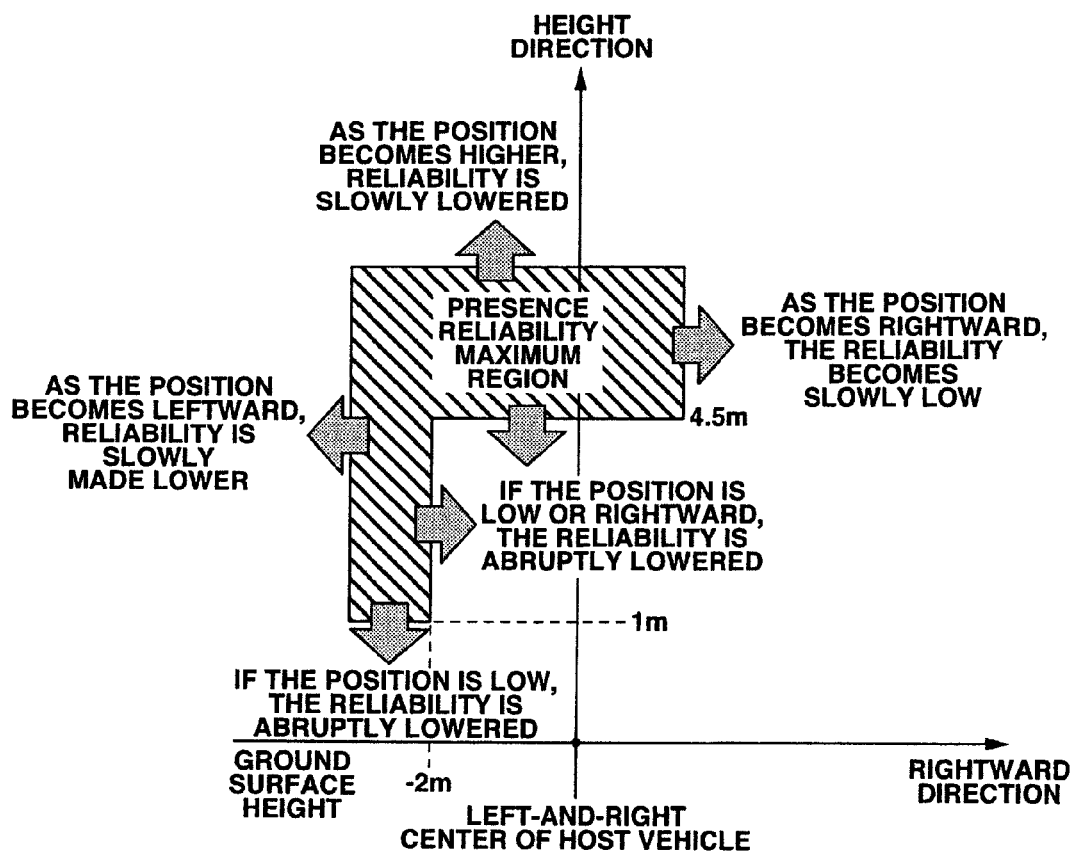
FIG. 14 is a diagram for explaining a determination of a presence reliability of a temporary stop mark from a position detected by the corresponding mark.
Figure 15B:
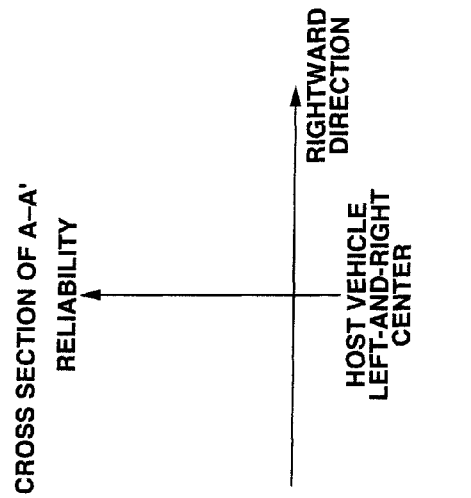
FIGS. 15A, 15B, 15C, 15D, and 15E are diagrams representing a relationship between lateral positions of detected temporary stop mark and the presence reliability of the temporary stop mark as viewed from various heights of the temporary stop mark.
Figure 15E:
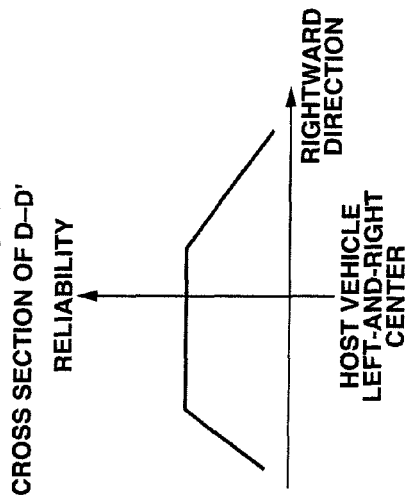
Figure 15A:
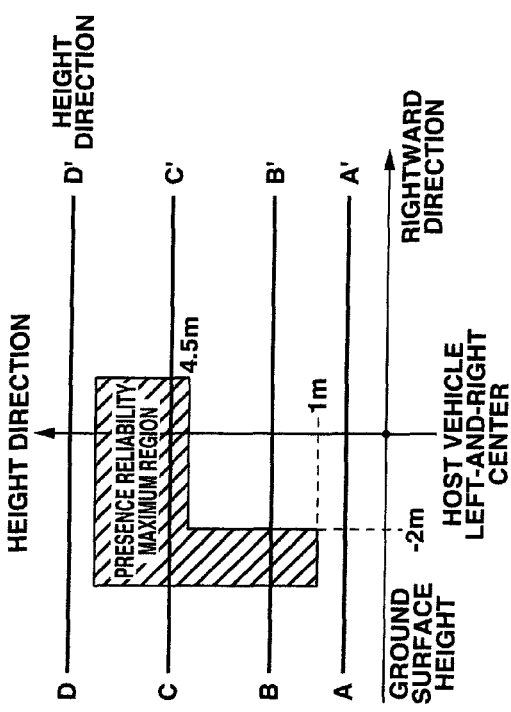
Figure 15D:
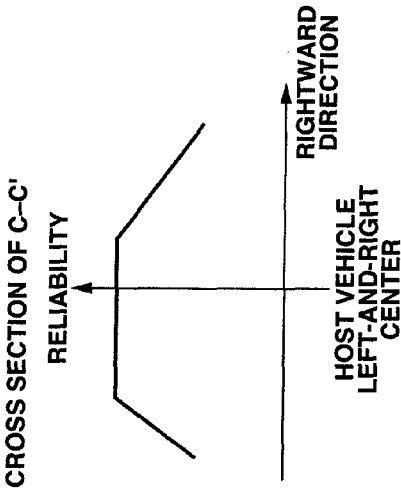
Figure 15C:
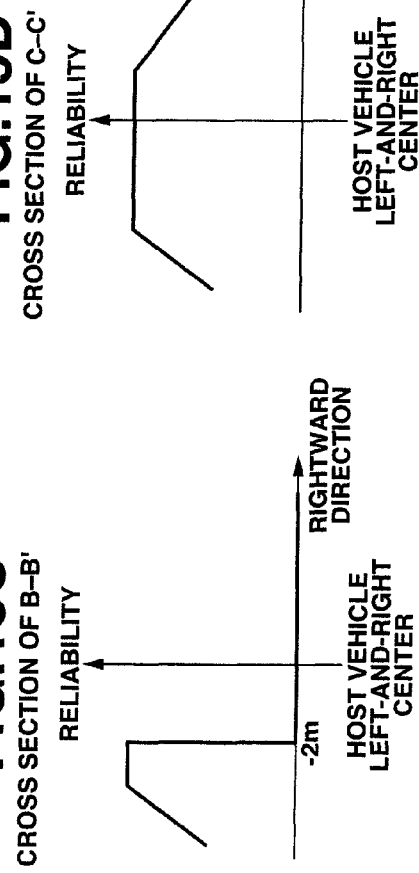

FIGS. 13A and 13B integrally show a flowchart representing a flow of a driving support control process by control unit 2 in the second embodiment. Hereinafter, each step will be described below. It should be noted that, for the steps which perform the same processes as those shown in the flowchart of FIGS. 2A and 2B, the same step numbers are allocated and their description will herein be omitted.

At a step S21, a temporary stop estimation element detection process in which control unit 2 outputs a command to detect the stop-line and detect a temporary stop mark both from the photographed image to traveling environment recognition section 1. Then, the routine goes to a step S22. The temporary stop mark recognition is, for example, carried out by matching this mark with a template of the temporary stop mark stored previously in data ROM 2c. At step S22, control unit 2 determines whether the temporary stop mark at step S21 has been detected by a temporary stop mark determination section 24. If Yes, the routine goes to a step S23. If No, the routine goes to a step S2. At step S23, a stop necessity point of the temporary stop mark is added to an overall stop necessity point and the routine goes to a step S24. The stop necessity point is a point for a height of the stop necessity of an object to be a stop position estimation element (in this case, the temporary stop mark) and, in this second embodiment, the stop necessity point is divided into four steps of "stop essential", "there is a possibility of stop necessity", "warning is needed", and "stop not necessary". The temporary stop mark is a mark at which the vehicle is at all times stopped when this mark is actually present. There is an extremely high possibility of coincidence of a position at which the temporary stop mark is present with the position at which the vehicle is to be stopped. Hence, the stop necessity point is "stop essential".

At step S24, a reliability determination section 22 calculates the reliability of presence of the temporary stop mark and the routine goes to a step S25. The reliability determination section 22 calculates a certainty by which the temporary stop mark is present from a plurality of determination elements such as a magnitude, dimension, position, and memory description contents. Since the installation position and dimension of the temporary stop mark is prescribed in "Regulations on Road marks, Block lines, and Road indications", there is low possibility of the presence of temporary stop mark in a case where the temporary stop mark is placed at a position equal to or lower than a height 1 m which is outside of a prescribed region (reliability of presence maximum region) as shown in FIG. 14 and FIGS. 15A through 15E.

Figure 16:
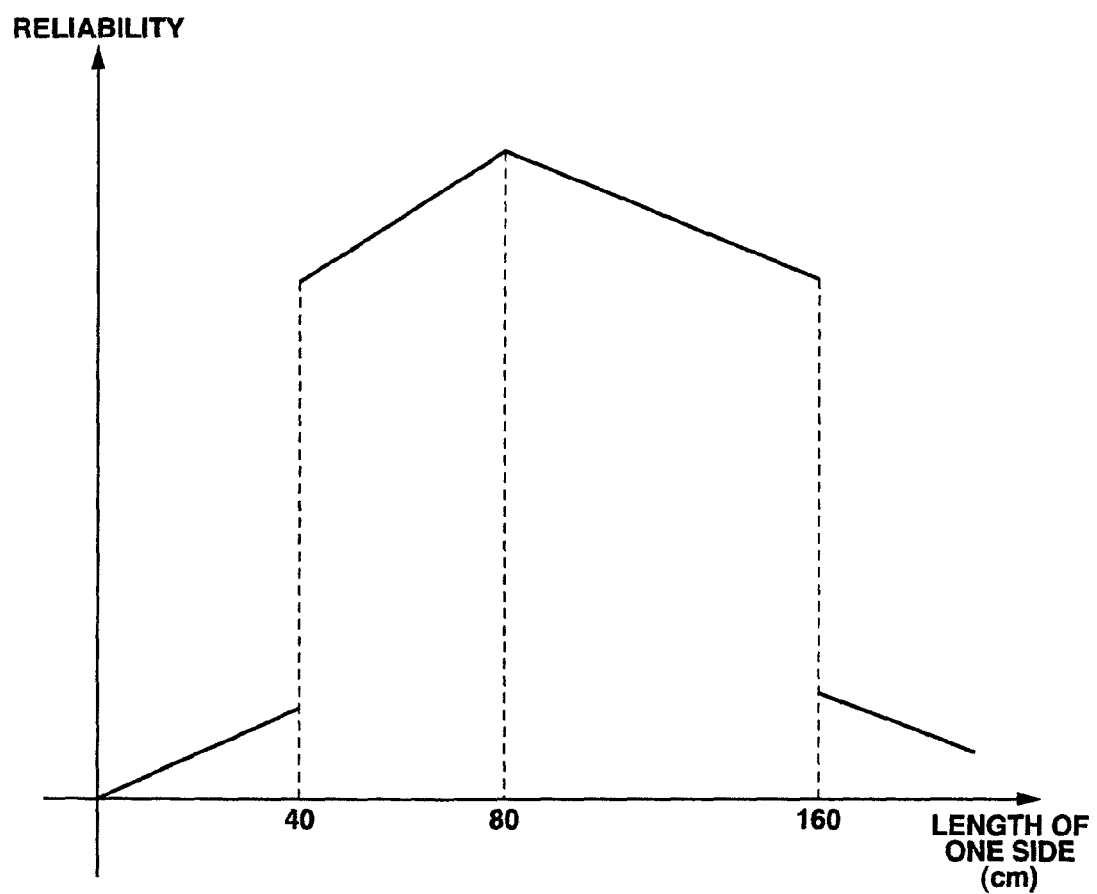
FIG. 16 is a diagram determining the presence reliability of the temporary stop mark from a length of one side detected by the mark.

A determination criterion (standard of judgment) is set in such a way that there is a low possibility that one side of the temporary stop mark which does not fall within the defined region (maximum region of the reliability of the presence). As far as the dimension is concerned, in a case where one side which is a standard dimension, as shown in FIG. 16, and is 80 cm, the reliability of presence is set to a highest, in a case where the one side becomes nearer to 40 cm and 160 cm which are limits of admitted expansion and constriction ranges, the reliability of the presence is set to become lowered, and in a case where the one side is in excess of these limit values, the reliability of presence is set to become abruptly be lowered. As far as the position is concerned, the temporary stop mark is specified as 1 m or higher according to the above-described command, in a case where it is installed at a position just above a vehicle traffic position. Thus, at the traffic position as shown in FIG. 16 has high reliability of presence is set to be low. In a case where the temporary stop mark is positioned at a more rightward or downward position than the traffic position, the reliability is abruptly lowered and in a case where the temporary stop mark is positioned at a more leftward or upward direction, the reliability of presence is slowly lowered since the above-described command is not deviated. It should be noted that numerical values are not limited to those illustrated according to the necessity of the modification of the command and corresponding to the exceptional installation situation and the necessity of consideration of measurement errors and noises. As the description content of the temporary stop mark, the effect that letters of white "stop" background of red color are recognizable is ideal. The certainty of presence from the content of the description is maximum. In a case where cameras 1a, 1b cannot discriminate the color of the object, a state in which the letter denotation having the high brilliance are detected is a situation under which the certainty of presence is highest. In addition, even if a recognition situation as compared with the above-described situation is inferior, to prevent a misrecognition of such a mark of a similar form as a slow-down driving mark, the temporary stop mark can be detected with high precision by providing the determination criterion that the whole mark is approximately single color.

At a step S25, control unit 2 sets the stop position point (coefficient) according to the temporary stop mark which is multiplied with the reliability of presence calculated at step S24 as a stop position accuracy point and the routine goes to a step S26. The stop position point is set by a proper stop position coefficient setting section 25. It should, herein, be noted that the stop position point is a point indicating a certainty of a stop position by means of an object (herein in the second embodiment, the temporary stop mark). In the second embodiment, the stop position is divided into three stages, in the sequence having the higher point, "the stop position itself", "weak certainty of the stop position", and "indefinite position of the object". The temporary stop mark has an extremely high possibility of presence in the stop position. The stop position point is assumed to be "the stop position itself".

At step S26, control unit 2 adds the stop position accuracy point through the temporary stop mark calculated through step S25 to the whole stop position accuracy point and the routine goes to step S2. At step S2, control unit 2 determines whether the stop line is detected. If Yes at step S2, the routine goes to a step S27. If No at step S2, the routine goes to a step S30. At step S27, control unit 2 adds the stop necessity point of the stop line to the whole stop necessity point and the routine goes to a step S28. The stop line requires the warning and the stop necessity point is assumed to be waning required. At step S29, control unit 2 adds stop position accuracy point of the stop line to the overall stop necessity point calculated at step S28 to the overall stop position accuracy point and the routine goes to a step S31.

At step S31, control unit 2 determines whether a sum of the overall stop accuracy point and overall stop necessity point as the stop point and the routine goes to step S31. At step S31, control unit 2 determines whether a sum of the overall stop position accuracy point and the overall stop necessity point is equal to or constant (predetermined value). If Yes at step S31, the routine goes to step S5. If No at step S31, the routine transfers to RETURN.

Next, an action in the second embodiment will be described below.

[Reduction Action of a Sense of Incongruity at a Time of Driving Support]

In the second embodiment, the stop necessity point representing the height of the stop necessity point and the stop position accuracy point of the stop position point representing the certainty of the stop position multiplied by the reliability of presence are calculated for the temporary stop mark and the stop line, respectively. If a total sum of these values (overall stop necessity points+overall stop position accuracy point) is equal to or larger than a predetermined value, control unit 2 performs the driving support. In more details, not only the certainty of the stop position but also the height of the stop necessity are reflected on the driving support so that the degree of control intervention is varied in accordance with the stop necessity of the stop position. Thus, the separation of the driving support from an optimum reliability of the presence in accordance with the actual situation and the actual driving support can be suppressed and the sense of incongruity that the driver feels can be reduced.

In addition, in the second embodiment, the stop position accuracy point is calculated which is a multiplication of the reliability of presence of the temporary stop mark and the stop line. For the reliability determined from the photographed image, the stop position accuracy point representing the certainty of the stop position by the object is calculated so that the necessity to stop the stop position can be calculated with high accuracy. Thus, the driving support having a small quantity of the sense of incongruity can be achieved.

It should herein be noted that, since the action and advantages are the same as those of the first embodiment and their detailed description will herein be omitted.

Next, the advantages of the vehicular control apparatus in the second embodiment will be described below.

The vehicular control apparatus in the second embodiment has the following advantages in addition to the advantages of (1) through (4) in the first embodiment. (5) A proper value stop position coefficient setting section 25 which sets the coefficients corresponding to kinds of the signals and marks measured by the traveling environment measurement section (on-board cameras 1a, 1b), reliability determination section 22 calculates the reliability of presence of the measured traveling environment (stop position accuracy point) on a basis of the determined reliability and set coefficient, and control unit 2 operates the actuator (driving control apparatus and engine 14) in accordance with the calculated reliability of presence. Thus, the necessity to stop at the stopped position can be calculated with the high accuracy and the driving support having less sense of incongruity can be achieved.

Third Embodiment

First, the structure of the vehicular control apparatus in a third preferred embodiment will be described below. It should be noted that the detailed description of the same parts as those in the first and second embodiments will herein be omitted.

[Driving Support Control Process]

Figure 17A:
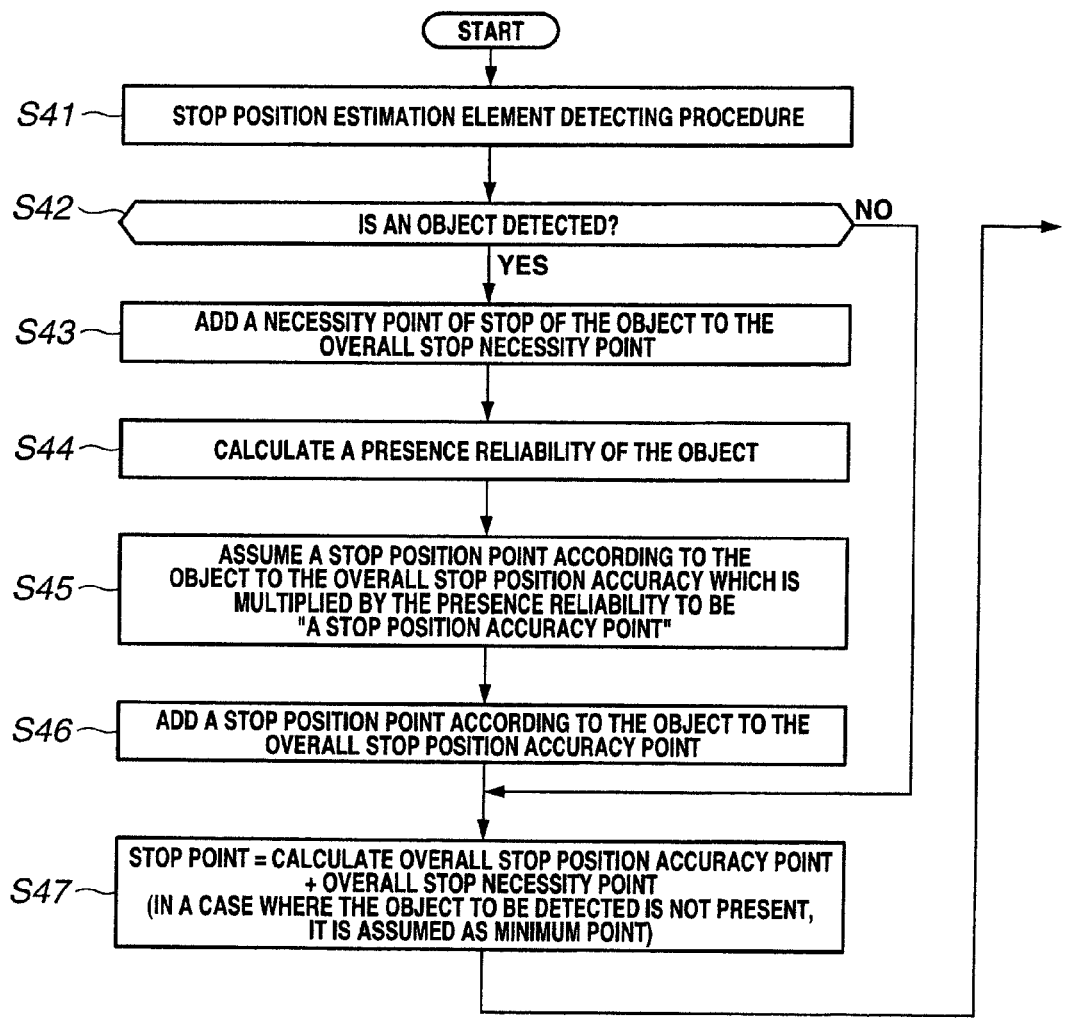
FIGS. 17A and 17B are integrally a flowchart representing a flow of a driving support control process by means of control unit 2 in a third preferred embodiment of the vehicular support apparatus according to the present invention.
Figure 17B:
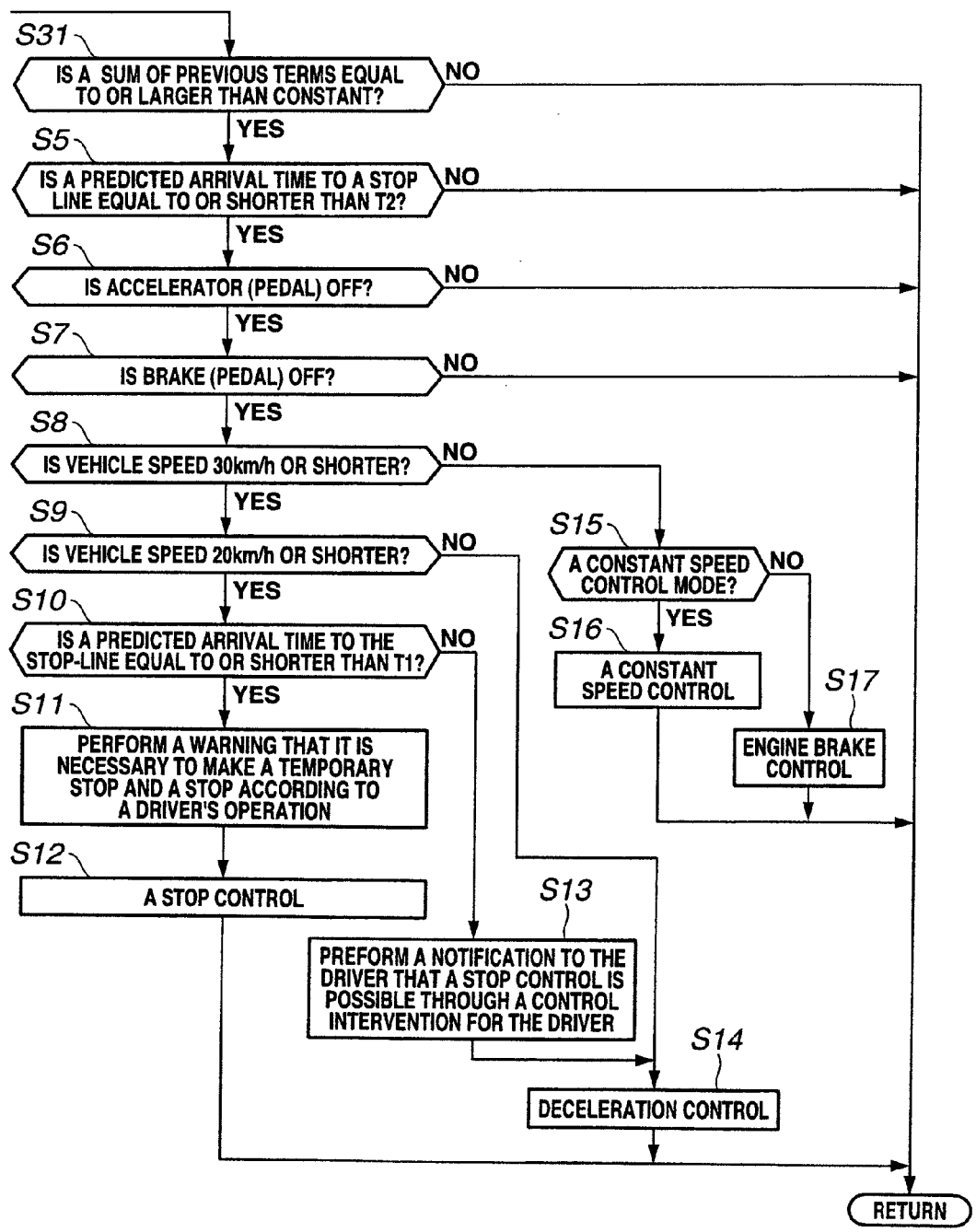

FIGS. 17A and 17B integrally show a flowchart representing the driving support control process by means of control unit 2 in the third embodiment.

It should be noted that the steps in which the same process as those shown in FIGS. 2A and 2B in the first embodiment or those shown in FIGS. 13A and 13B of the second embodiment is executed have allocated to the same step number and the detailed description thereof will herein be omitted.

At a step S41, control unit 2 executes the stop position estimation element detection process to output the command to detect (mark, signal, and so forth) all stop position estimation elements (mark, signal, and so forth) from the photographed image to traveling environment recognition section 1 and the routine goes to a step S42. For each stop position estimation element, a matching is performed between each stop position estimation element and, for example, the template of each stop position estimation element stored already in data ROM 2c.

At a step S42, control unit 2 determines whether at least one of objects which are stop position estimation elements at step S21 has been detected. If Yes at step S42, the routine goes to a step S43. If No at step S47, the routine goes to a step S47.

At step S43, the stop necessity point of each of the objects detected at step S41 is added to overall stop necessity point and the routine goes to a step S44. The stop necessity point of each of the objects is shown in a left row of FIG. 18. It should be noted that since, in a case where a red signal is detected, the vehicle is always stopped if this is present, the stop necessity point is assumed to be "stop is essential". However, the red signal is not always at a straight ahead of the position to be stopped. There is often a case where the signal is positioned at a more depth side of a traffic intersection point. This does not say that the position to be stopped does not recite the element whose position is to be stopped. Thus, the stop necessity point may be called "warning is required".

At step S44, reliability determination section 22 calculates the respective reliabilities of respective objects and the routine goes to a step S45. The method of reliability of each of the objects is described in FIG. 19.

At step S46, control unit 2 adds the stop position accuracy point by means of each of the objects calculated at step S45 to the stop position accuracy point and the routine goes to a step S47. At step S47, control unit 2 calculates the addition between overall stop position accuracy point and overall stop necessity points as the stop point and the routine goes to a step S47. It should be noted that in a case where the object is detected at step S42, the stop point indicates a minimum point (for example, zero).

Next, the action of the third embodiment of the vehicular control apparatus will be described below.

The stop necessity point and the stop position accuracy point are calculated for all of the detected stop position estimation elements and driving support is carried out in a case where the total sum of these points is equal to or larger than the predetermined value, in the third embodiment. Thus, the necessity of stopping at the stop position can be calculated with higher accuracy than the second embodiment. Consequently, the driving support with less sense of incongruity can be achieved. It should be noted that the vehicular control apparatus in the third embodiment has the same action and advantages that the second embodiment has.

Although shape and position of the temporary stop mark are different according to countries in each of which the temporary stop mark is used, the contents of the present invention is applicable. In addition, the present invention is applicable with the pedestrian crossing itself recognized as the stop line.

Other Embodiments

The embodiments which carry out the present invention have been described on a basis of various embodiments. The specific structure according to the present invention is not limited to each of these described in the corresponding one of the preferred embodiments. Various design changes and modifications may be made without departing from the scope of the present invention.

For example, in the driving support described in each of the embodiments, one of the stop control, the deceleration control (including the engine braking), the constant speed control, the warning to the vehicle driver through the vocal sound or the image, and nothing is done is selected on a basis of the height of the reliability of presence of the calculated stop line, the presence or absence of the driver's operation, the predicted arrival time from the vehicle to the stop-line, and the vehicle speed. However, the present invention is not limited to this. An alternative in which the warning only or the deceleration control only may be switched in accordance with the height of reliability of presence may be provided. In addition, the deceleration generated according to the height of reliability may become larger as the reliability of presence becomes higher. In a case of step S6 in FIG. 2A in which the accelerator opening angle is larger than zero but equal to or lower than predetermined value A1, the slow deceleration may be carried out.

In the first embodiment, in the case of the brake ON, the driving support is not carried out by a priority in which the generation of the deceleration by means of the driver's operation. However, the warning may be issued in another warning. In a case where the determination is made that the vehicle cannot be stopped to the position to be stopped, the control intervention may be made with an equilibrium between the driver's deceleration operation degree and the actually required deceleration (quantity) taken into consideration. In each of the second and third embodiments, the stop necessity point is divided into four stages and the stop necessity point is divided into three stages. Each point may be classified into any of a plurality of stages. In the embodiments, the stereo camera constituted by two cameras 1a, 1b as the traveling environment measurement section is adopted. However, a combination of the single camera and means for calculating the distance to the object (for example, laser radar, millimeter-wave radar, or so forth) may be adopted.

The technical ideas other than the invention described in the claims (scope of the present invention) grasped from the preferred embodiments will be described below.

(a) In the vehicular control apparatus as set forth in the claim 2, the reliability determination section determines the points of places at which each of the calculated brilliances is higher than a predetermined brilliance that the reliability as the stop-line is high. According to the present invention, even if the camera has a structure of not being capable of identifying the color, the reliability of the stop-line can be determines. In addition, since the brilliance of the stop-line which is the white line drawn on the road surface is higher than that of any other portion, the reliability of the stop-line can be determined with high accuracy.

(b) In the vehicular control apparatus as set forth in the claim 2, the reliability determination section calculates a density of points of places at each of which the calculated brilliance is higher than a predetermined brilliance and determines that the reliability of being the stop-line is high in a case where the calculated density is high. According to the present invention, the reliability of the stop-line can be determined with high accuracy.

(c) In the vehicular control apparatus as set forth in claim 5, the traveling environment measurement section measures the stop-line on the road surface, measures a distance between the stop-line and the vehicle, and comprises: an arrival time calculation section configured to measure an arrival time during which the vehicle arrives at the stop-line on a basis of the measured distance and the actuator control section operates the braking controller in a case where the calculated arrival time is shorter than a preset time and the reliability determined by the reliability determination section is higher than a preset reliability.

According to the present invention, the vehicle can be decelerated in accordance with the position of the stop-line. In addition, since a weak deceleration control is continued from a remote position of the stop-line, the sense of incongruity and the unpleasant feeling can be prevented to be given to the driver.

(d) In the vehicular control apparatus as set forth in the claim 1, an information measured by the traveling environment measurement section is a white line drawn on a road surface and a mark and the reliability determination section determines the reliability on a basis of a result of determination by a stop-line determination section configured to make the determination of whether the white line is the stop-line and another result of determination by a mark determination section configured to make the determination of whether the mark is a temporary stop mark.

According to the present invention, the operation of the actuator based on the stop-line and the temporary stop mark can be approached to the optimum operation in accordance with the actual traveling environment and the sense of incongruity that the driver gives can be reduced.

(e) In the vehicular control apparatus as set forth in item (d), the vehicular control apparatus further comprises: an arrival time calculation section configured to calculate a time for the vehicle to arrive at the stop-line and the actuator control section operates the actuator in a case where the determination by the reliability determination section is higher than a preset reliability and the calculated arrival time is shorter than a preset arrival time and limit the operation of the actuator in a case where the determination by the reliability determination section is higher than the preset reliability and the calculated arrival time is longer than the preset arrival time.

According to the present invention, the control intervention according to the drive of the actuator in accordance with the position of the stop-line can be carried out. In addition, since the weak control intervention from the remote position of the stop-line is continued, the sense of incongruity and the unpleasant feeling that the driver gives can be prevented from occurring.

(f) In the vehicular control apparatus as set forth in item (d), the vehicular control apparatus further comprises: a vehicle speed detecting section configured to detect a speed of the vehicle and the actuator is constituted by a braking controller and the actuator control section operates the braking controller in a case where the determination by the reliability determination section is higher than a preset reliability and the vehicle speed is lower than a predetermined vehicle speed and limits the operation of the braking controller in a case where the determination by the reliability determination section is higher than the preset reliability and the vehicle speed is higher than the predetermined vehicle speed.

According to the present invention, the vehicle is decelerated only when the determination is made that there is a high possibility of having a deceleration intention by the vehicle driver so that the deceleration of the vehicle is limited in a case where the driver has no intention of the deceleration. Consequently, the sense of incongruity that the driver gives can be prevented from occurring.

(g) In the vehicular control apparatus as set forth in item (d), the vehicular control apparatus further comprises: a proper stop position coefficient setting section configured to set a coefficient corresponding to a kind of a signal or a mark measured by the traveling environment measurement section, the reliability determination section calculates the reliability of presence of the measured traveling environment on a basis of the determined reliability and the set coefficient, and the actuator control section operates the actuator in accordance with the calculated reliability.

According to the present invention, the necessity of stopping at the stop position can be calculated with high accuracy and the operation of the actuator with less sense of incongruity can be realized.

(h) There is provided a vehicular control apparatus comprising: a camera photographing a situation of a forward position of an advance direction of a vehicle in which a braking controller is mounted; a reliability determination section configured to determine a reliability of whether a point to be stopped by the vehicle at the next is present from an image photographed by means of the camera; and
a braking control section configured to control an operation of the braking controller in accordance with the determined reliability.

According to the present invention, the operation of the braking controller can be approached to an optimum operation in accordance with the actual traveling environment and the driving support having less sense of incongruity that the driver gives can be realized.

(i) In the vehicular control apparatus as set forth in item (h), the vehicular control apparatus further comprises an arrival time calculation section configured to calculate a time for the vehicle to arrive at a stop-line, the camera photographs the stop-line drawn on a road surface, and the braking control section operates the braking controller when the calculated arrival time is shorter than a preset arrival time in a case where the determination by the reliability determination section is higher than a preset reliability and limits the operation of the braking controller when the calculated arrival time is longer than the preset arrival time in the case where the determination by the reliability determination section is higher than the preset reliability. According to the present invention, the vehicle can be decelerated in accordance with the position of the stop-line. In addition, since the weak deceleration control is continued from the remote position of the stop-line, the sense of incongruity and the unpleasant feeling that the driver gives can be prevented from occurring.

(j) In the vehicular control apparatus as set forth in item (h), the vehicular control apparatus further comprises: a vehicle speed detecting section configured to detect a speed of the vehicle, the camera photographs a stop-line drawn on a road surface, and the braking control section operates the braking controller when the detected vehicle speed is lower than a preset vehicle speed in a case where the determination made by the reliability determination section is higher than a preset reliability and limits the operation of the braking controller when the detected vehicle speed is higher than the preset vehicle speed in the case where the determination made by the reliability determination section is higher than the preset reliability.

According to the present invention, the vehicle is decelerated only in a case where there is a high possibility of having the deceleration intention by the driver so that the sense of incongruity that the driver gives can be prevented from occurring.

(k) In the vehicular control apparatus as set forth in item (h), the reliability determination section calculates respective brilliances of a plurality of points of places within an image of a road surface photographed by the camera as the traveling environment and determines the reliability of the stop-line drawn on the road surface on a basis of the calculated brilliances.

According to the present invention, even in a case where the camera has no structure of being incapable of determining the color, the reliability of the stop-line can be determined.

(l) In the vehicular control apparatus as set forth in item (k), the reliability determination section determines points of places at which each of the calculated brilliances is higher than a predetermined brilliance that the reliability as the stop-line is high.

According to the present invention, since the brilliance of the stop line which is the white line drawn on the road surface is higher than that of any other portion, the reliability of the stop-line can be determined with high accuracy.

(m) In the vehicular control apparatus as set forth in item (h), the vehicular control apparatus further comprises: a proper stop position coefficient setting section configured to set a coefficient corresponding to a kind of a signal or a mark which is measured by the traveling environment measurement section and wherein the reliability determination section calculates the reliability of presence on the measured traveling environment on a basis of the determined reliability and the set coefficient and the braking control section operates the braking controller in accordance with the calculated reliability of presence.

According to the present invention, the necessity of stopping at the stopped position can be calculated with high accuracy and the operation of the braking controller with less sense of incongruity can be realized.

(n) There is provided a vehicular control method comprising: photographing a situation of a forward position of an advance direction of a vehicle in which a braking controller is mounted through a camera; determining a reliability of whether a point to be stopped by the vehicle at the next is present from an image photographed by means of the camera; and a braking control section configured to control an operation of the braking controller in accordance with the determined reliability; and controlling an operation of the braking controller in accordance with the determined reliability.

(o) In the vehicular control method as set forth in item (n), the operation of the braking controller is allowed in a case where the determined reliability is higher than a preset reliability and the operation of the braking controller is limited in a case where the determined reliability is lower than the preset reliability.

This application is based on a prior Japanese Patent Application No. 2009-215802 filed in Japan on Sep. 17, 2009. The entire contents of Japanese Patent Applications No. 2009-215802 with a filing date of Sep. 17, 2009 are hereby incorporated by reference. Although the invention has been described above by reference to certain embodiments of the invention, the invention is not limited to the embodiment described above. Modifications and variations of the embodiments described above will occur to those skilled in the art in light of the above teachings. The scope of the invention is defined with reference to the following claims.

What is claimed is:

1. A vehicular control apparatus comprising:
   a traveling environment measurement section comprising a camera and configured to measure a traveling environment of a forward position of an advance direction of a vehicle in which an actuator for a vehicular control purpose is mounted; and
   a control unit comprising:
   a reliability determination section configured to determine a reliability of a stop-line drawn on a road surface or a mark obtained from the result of measurement used for the determination of whether the vehicle should be decelerated; and
   an actuator control section configured to perform an operation of the actuator with the determined reliability as a requiring condition, wherein:
   the reliability determination section calculates brilliances of a plurality of points of places within an image of the road surface as the traveling environment photographed by the camera, and determines the reliability of the stop-line drawn on the road surface, according to the brilliances of the image photographed by the camera,
   the control unit of the vehicular control apparatus further comprises: a proper stop position coefficient setting section configured to set a coefficient corresponding to a kind of a signal or mark which is measured by the traveling environment measurement section, and
   the reliability determination section calculates the reliability of presence on the measured traveling environment on a basis of the determined reliability and the set coefficient, and the actuator control section operates the actuator in accordance with the calculated reliability of presence.

2. The vehicular control apparatus as claimed in claim 1, wherein the reliability determination section is configured to determine a portion of the plurality of points of places within the photographed image of the road surface, whose brilliances are equal to or higher than a first predetermined value to be the stop-line drawn on the road surface.

3. The vehicular control apparatus as claimed in claim 1, wherein the reliability determination section is configured to determine a portion of the plurality of points of places within the photographed image of the road surface, in which a density of the brilliances is equal to or higher than a second predetermined value to be the stop-line drawn on the road surface.

4. The vehicular control apparatus as claimed in claim 1, wherein the actuator is constituted by a braking controller.

5. The vehicular control apparatus as claimed in claim 4, wherein the vehicular control apparatus further comprises: an accelerator pedal operation state detecting section configured to detect an operation state of an accelerator pedal that a vehicle driver operates, and wherein the actuator control section operates the braking controller in accordance with the calculated reliability to decelerate the vehicle in a case where a deceleration intention of the vehicle driver is detected from the operation state of the detected accelerator pedal.

6. The vehicular control apparatus as claimed in claim 5, wherein the traveling environment measurement section measures the stop-line on the road surface, measures a distance between the stop-line and the vehicle, and comprises: an arrival time calculation section configured to measure an arrival time during which the vehicle arrives at the stop-line on a basis of the measured distance, and the actuator control section operates the braking controller in a case where the calculated arrival time is shorter than a preset time and the reliability determined by the reliability determination section is higher than a preset reliability.

7. The vehicular control apparatus as claimed in claim 1, wherein an information measured by the traveling environment measurement section is a white line drawn on a road surface and a mark, and the reliability determination section determines the reliability on a basis of a result of determination by a stop-line determination section configured to make the determination of whether the white line is the stop-line and another result of determination by a mark determination section configured to make the determination of whether the mark is a temporary stop mark.

8. The vehicular control apparatus as claimed in claim 7, wherein the vehicular control apparatus further comprises: an arrival time calculation section configured to calculate a time for the vehicle to arrive at the stop-line, and the actuator control section operates the actuator in a case where the determination by the reliability determination section is higher than a preset reliability and the calculated arrival time is shorter than a preset arrival time, and limits the operation of the actuator in a case where the determination by the reliability determination section is higher than the preset reliability and the calculated arrival time is longer than the preset arrival time.

9. The vehicular control apparatus as claimed in claim 7, wherein the control unit of the vehicular control apparatus further comprises: a vehicle speed detecting section configured to detect a speed of the vehicle and the actuator is constituted by a braking controller, and the actuator control section operates the braking controller in a case where the determination by the reliability determination section is higher than a preset reliability and the vehicle speed is lower than a predetermined vehicle speed, and limits the operation of the braking controller in a case where the determination by the reliability determination section is higher than the preset reliability and the vehicle speed is higher than the predetermined vehicle speed.

10. The vehicular control apparatus as claimed in claim 7, wherein the control unit of the vehicular control apparatus further comprises: a proper stop position coefficient setting section configured to set a coefficient corresponding to a kind of a signal or a mark measured by the traveling environment measurement section, the reliability determination section calculates the reliability of presence of the measured traveling environment on a basis of the determined reliability and the set coefficient, and the actuator control section operates the actuator in accordance with the calculated reliability.

11. A vehicular control apparatus comprising:
a camera photographing a situation of a forward position of an advance direction of a vehicle in which a braking controller is mounted; and a control unit comprising:
a reliability determination section configured to determine a reliability of whether a stop line or mark drawn on a road surface and used to determine whether the vehicle should be decelerated, is present from an image photographed by means of the camera; and a braking control section configured to control an operation of the braking controller in accordance with the determined reliability, wherein
the reliability determination section calculates respective brilliances of a plurality of points of places within an image of the road surface photographed by the camera as the traveling environment, and determines the reliability of the stop-line drawn on the road surface, on a basis of the calculated brilliances,
the control unit of the vehicular control apparatus further comprises: a proper stop position coefficient setting section configured to set a coefficient corresponding to a kind of a signal or a mark which is measured by the traveling environment measurement section, and
the reliability determination section calculates the reliability of presence on the measured traveling environment on a basis of the determined reliability and the set coefficient, and the braking control section operates the braking controller in accordance with the calculated reliability of presence.

12. The vehicular control apparatus as claimed in claim 11, wherein the control unit of the vehicular control apparatus further comprises an arrival time calculation section configured to calculate a time for the vehicle to arrive at the stop-line, the camera photographs the stop-line drawn on the road surface, and the braking control section operates the braking controller when the calculated arrival time is shorter than a preset arrival time in a case where the determination by the reliability determination section is higher than a preset reliability, and limits the operation of the braking controller when the calculated arrival time is longer than the preset arrival time in the case where the determination by the reliability determination section is higher than the preset reliability.

13. The vehicular control apparatus as claimed in claim 11, wherein the control unit of the vehicular control apparatus further comprises: a vehicle speed detecting section configured to detect a speed of the vehicle, the camera photographs a stop-line drawn on the road surface, and the braking control section operates the braking controller when the detected vehicle speed is lower than a preset vehicle speed in a case where the determination made by the reliability determination section is higher than a preset reliability, and limits the operation of the braking controller when the detected vehicle speed is higher than the preset vehicle speed in the case where the determination made by the reliability determination section is higher than the preset reliability.

14. The vehicular control apparatus as claimed in claim 11, wherein the reliability determination section determines points of places at which each of the calculated brilliances is higher than a predetermined brilliance that the reliability as the stop-line is high.

15. A vehicular control method comprising:
photographing, via a camera, a situation of a forward position of an advance direction of a vehicle in which a braking controller is mounted;
determining a reliability of whether a stop line or mark drawn on a road surface used to determine whether the vehicle should be decelerated, is present from an image photographed by means of the camera; and
controlling an operation of the braking controller in accordance with the determined reliability, wherein
respective brilliances of a plurality of points of places within an image of the road surface photographed by the camera, are calculated as the traveling environment,
the reliability of the stop-line drawn on the road surface is determined on a basis of the calculated brilliances, and a coefficient corresponding to a kind of a signal or a mark which is measured is set, and
the reliability of presence on the measured traveling environment is calculated on a basis of the determined reliability and the set coefficient, and the braking controller is operated in accordance with the calculated reliability of presence.

16. The vehicular control method as claimed in claim 15, wherein the operation of the braking controller is allowed in a case where the determined reliability is higher than a preset reliability, and the operation of the braking controller is limited in a case where the determined reliability is lower than the preset reliability.

* * * * *